US008637632B2

United States Patent
Sasaki et al.

(10) Patent No.: US 8,637,632 B2
(45) Date of Patent: *Jan. 28, 2014

(54) METHOD FOR PRODUCING BINDER RESIN, PARTICULATE RESIN DISPERSION AND METHOD FOR PRODUCING SAME, ELECTROSTATIC IMAGE DEVELOPMENT TONER AND METHOD FOR PRODUCING SAME, ELECTROSTATIC IMAGE DEVELOPER, AND IMAGE FORMING METHOD

(75) Inventors: Yuki Sasaki, Kanagawa (JP); Satoshi Hiraoka, Kanagawa (JP); Fumiaki Mera, Kanagawa (JP); Hirotaka Matsuoka, Kanagawa (JP); Yasuo Matsumura, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1834 days.

This patent is subject to a terminal disclaimer.

(21) Appl. No.: 11/444,421

(22) Filed: Jun. 1, 2006

(65) Prior Publication Data

US 2007/0122730 A1    May 31, 2007

(30) Foreign Application Priority Data

Nov. 25, 2005  (JP) ................................. 2005-339763
Nov. 28, 2005  (JP) ................................. 2005-341981

(51) Int. Cl.
*C08G 63/82*  (2006.01)
*C08G 63/87*  (2006.01)

(52) U.S. Cl.
USPC ........................... 528/274; 528/272; 502/168

(58) Field of Classification Search
USPC ................... 528/272, 293, 295, 274, 168
See application file for complete search history.

(56) References Cited

U.S. PATENT DOCUMENTS

| | | | | | |
|---|---|---|---|---|---|
| 4,355,154 | A | * | 10/1982 | Saam et al. | 528/274 |
| 5,905,136 | A | * | 5/1999 | Po et al. | 528/279 |
| 8,003,821 | B2 | | 8/2011 | Sasaki et al. | |
| 2005/0255398 | A1 | | 11/2005 | Hiraoka et al. | |
| 2005/0286938 | A1 | | 12/2005 | Aze et al. | |
| 2006/0056890 | A1 | | 3/2006 | Aze et al. | |
| 2007/0287088 | A1 | | 12/2007 | Sasaki et al. | |

FOREIGN PATENT DOCUMENTS

| JP | 55-157625 | 12/1980 |
|---|---|---|
| JP | 04-264479 | 9/1992 |
| JP | A 05-194318 | 8/1993 |
| JP | 08-152798 | 6/1996 |
| JP | A 10-045890 | 2/1998 |
| JP | A 11-313692 | 11/1999 |
| JP | 2000-075702 | 3/2000 |
| JP | 2000-162912 | 6/2000 |
| JP | 2000-214703 | 8/2000 |
| JP | 2001-176648 | 6/2001 |
| JP | 2002-245535 | 8/2002 |
| JP | A-2003-029410 | 1/2003 |
| JP | A 2003-055302 | 2/2003 |
| JP | A-2003-155271 | 5/2003 |
| JP | A 2003-261662 | 9/2003 |
| JP | A 2003-306535 | 10/2003 |
| JP | A-2004-189797 | 7/2004 |
| JP | 2005-070376 | 3/2005 |
| JP | A-2005-140987 | 6/2005 |
| JP | A-2005-325266 | 11/2005 |

OTHER PUBLICATIONS

Jul. 20, 2010 Office Action issued in Japanese Application No. 2005-339763 (with translation).

* cited by examiner

*Primary Examiner* — Ling Choi
*Assistant Examiner* — Gennadiy Mesh
(74) *Attorney, Agent, or Firm* — Oliff & Berridge, PLC

(57) ABSTRACT

A method for producing a binder resin comprises polycondensing a polycondensable monomer by using a polycondensation catalyst that comprises: at least one of compounds of formula (I) or (II); and at least one of compounds represented of formula (III) or (IV), wherein weight ratio of total amount of the compounds of formula (I) or (II) to total amount of the compounds of formula (III) or (IV) is from 5:95 to 95:5:

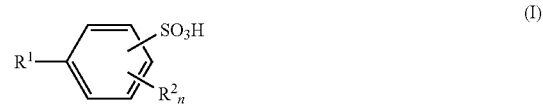

(I)

wherein $R^1$ represents a $C_8$-$C_{20}$ straight-chain alkyl group; $R^2$ represents a monovalent organic group; and number n of substituents $R^2$ represents an integer of from 0 to 4;

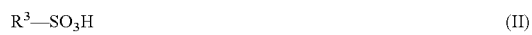

(II)

wherein $R^3$ represents a $C_8$-$C_{20}$ straight-chain alkyl group;

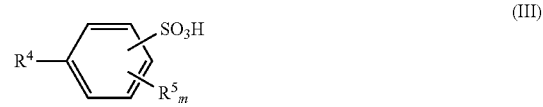

(III)

wherein $R^4$ represents a $C_8$-$C_{20}$ branched alkyl group; $R^5$ represents a monovalent organic group; and number m of substituents $R^5$ represents an integer of from 0 to 4; and

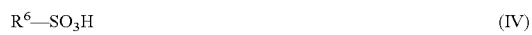

(IV)

wherein $R^6$ represents a $C_8$-$C_{20}$ branched alkyl group.

6 Claims, No Drawings

METHOD FOR PRODUCING BINDER RESIN, PARTICULATE RESIN DISPERSION AND METHOD FOR PRODUCING SAME, ELECTROSTATIC IMAGE DEVELOPMENT TONER AND METHOD FOR PRODUCING SAME, ELECTROSTATIC IMAGE DEVELOPER, AND IMAGE FORMING METHOD

This application claims priority under 35 USC 119 from Japanese patent documents, Japanese Patent Application No. 2005-339763 filed on Nov. 25, 2005, and Japanese Patent Application No. 2005-341981 filed on Nov. 28, 2005, the disclose of which is incorporated by reference herein.

BACKGROUND

1. Technical Field

The present invention relates to a binder resin suitable for the use in the development of an electrostatic latent image formed by electrophotography or electrostatic recording method with a developer. The present invention also relates to a particulate resin dispersion produced from the binder resin and an electrostatic image development toner produced therefrom. The present invention further relates to an electrostatic image toner comprising the electrostatic image development toner and an image forming method.

2. Related Art

In recent years, with the rapid spread of digitization technique, it has bee required to enhance the quality of image outputs such as printed image and copied image for users at ordinary home, office and publishing field. On the other hand, in order to realize a durable society, there has been a growing demand for reduction and saving of energy required for enterprise activity and products as its results. Then, in image forming methods involving electrophotography or electrostatic recording, too, it is necessary that the electric power required at the fixing step, which consumes much energy, be saved and the step of producing products from photographic materials be effected with low environmental burden. As a countermeasure against the former problem there may be proposed an approach involving the lowering of the toner fixing temperature. By lowering the toner fixing temperature, the required electric power can be saved. Further, the time required until the temperature at which the surface of the fixing member is reached, i.e., so-called warming-up time can be reduced and the life of the fixing member can be prolonged.

As a toner binder resin there has heretofore been widely used a vinyl-based polymer. In order to obtain offset resistance, it has been proposed to use a high molecular polymer. However, since a high molecular vinyl-based polymer has a high softening point, it is necessary that the temperature of the heat roller be predetermined higher to obtain a fixed image with an excellent gloss. This is contrary to the requirement for energy saving.

On the other hand, a polyester resin has a rigid aromatic ring in its chain and thus has flexibility as compared with vinyl-based polymers and can be predetermined to have a lower molecular weight when the same mechanical strength is needed. Further, a polyester resin can be easily designed as a low temperature fixing resin as compared with vinyl-based binder resins from the standpoint of entangling of molecular chains and critical molecular weight. Thus, a polyester resin has been widely used as a binder resin for energy saving toner.

It is normally necessary that the polyester polycondensation method involve reaction at a temperature as high as more than 200° C. with stirring by a great dynamic power under highly reduced pressure for 10 or more hours, causing the consumption of a large amount of energy. In order to provide the reaction facilities with durability, a huge facility investment is often needed.

On the other hand, a study has been reported on the conversion of the high energy-consuming type method for producing polyester to a low energy-consuming type method by the use of catalysts having activity at low temperatures.

A polycondensation catalyst normally forms an intermediate with a monomer during the reaction to lower the activation energy, exerting an effect of accelerating the ester synthesis reaction. Brönsted acids, which have long been known to have catalytic activity, are similarly used in the polycondensation at low temperatures or under water. A Brönsted acid type catalyst is determined by the balance of an acid having a catalytic action with a lipophilic hydrophobic group moiety. In other words, the acidity of the catalyst governs the direct catalytic capacity and the hydrophobic group moiety governs the compatibility of the catalyst with monomers or oligomers and polymers thus produced to affect the progress of the reaction.

It has been heretofore occasionally practiced to use a Brönsted acid catalyst for polycondensation. However, neither the structure of the catalyst nor the invention concerning the use of a Brönsted acid catalyst having a plurality of specific structures have been reported.

Brönsted acid type catalysts which have heretofore been studied are materials having a general-purpose sulfonic acid groups such as sulfuric acid, p-toluenesulfonic acid and dodecylbenzenesulfonic acid. Neither the combination of these Brönsted acid type catalysts with monomers having adaptability to toner nor the structure of these Brönsted acid type catalysts themselves have been optimized.

Moreover, a Brönsted acid catalyst tends to deteriorate its reactivity when present in a large amount. This tendency becomes remarkable particularly with Brönsted acids having a long straight-chain aliphatic acid called soft type. In other words, when a Brönsted acid catalyst is used in an amount exceeding a certain proper catalytic amount, the reactivity shows a rapid drop, causing the occurrence of a phenomenon such as stop of the rise of molecular weight. In the case where the proper amount of the catalyst to be used is limited and a slight change of the amount of the catalyst affects the progress of the reaction, if a large-scale continuous production is assumed, the physical properties of the products vary from batch to batch. Further, very close process design and control are needed, causing the deterioration of productivity.

SUMMARY

The present invention is as set forth below.

<1> A method for producing a binder resin, comprising polycondensing a polycondensable monomer by using polycondensation catalysts, wherein as the polycondensation catalysts comprises: at least one of compounds represented by formula (I) or (II); and at least one of compounds represented by formula (III) or (IV), and wherein weight ratio of total amount of the compounds represented by formula (I) or (II) used to total amount of the compounds represented by formula (III) or (IV) used is from 5:95 to 95:5:

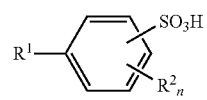

wherein $R^1$ represents a $C_8$-$C_{20}$ straight-chain alkyl group; $R^2$ represents a monovalent organic group; and number n of substituents $R^2$ represents an integer of from 0 to 4;

 (II)

wherein $R^3$ represents a $C_8$-$C_{20}$ straight-chain alkyl group;

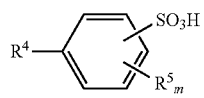 (III)

wherein $R^4$ represents a $C_8$-$C_{20}$ branched alkyl group; $R^5$ represents a monovalent organic group; and number m of substituents $R^5$ represents an integer of from 0 to 4; and

 (IV)

wherein $R^6$ represents a $C_8$-$C_{20}$ branched alkyl group.

<2> A method for producing a binder resin, comprising polycondensing a polyvalent alcohol with a polyvalent carboxylic acid that has a residue group to which carboxyl groups are connected, the residue group having 5 or more carbon atoms, by using a polycondensation catalyst, wherein the polycondensation catalyst comprises at least one of compounds represented by formulae (I') to (III'):

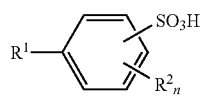 (I')

wherein $R^1$ represents a $C_{13}$-$C_{20}$ alkyl group; $R^2$ represents a group having a Hammett's value of less than 0.2 with sulfo group as reference; and n represents an integer of from 0 to 4;

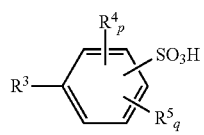 (II')

wherein $R^3$ represents a $C_8$-$C_{20}$ alkyl group; $R^4$ represents a group having a Hammett's value of 0.2 or more with sulfo group as reference; $R^5$ represents a group having a Hammett's value of less than 0.2 with sulfo group as reference; p represents an integer of from 1 to 4; and q represents an integer of from 0 to 3.

 (III')

wherein $R^6$ represents a $C_{10}$-$C_{20}$ alkyl group.

DETAILED DESCRIPTION

The method for producing a binder resin of the first exemplary embodiment of the invention concerns a method for producing a binder resin comprising polycondensing a polycondensable monomer by using a polycondensation catalyst, (hereinafter occasionally referred to as "polycondensation step"), wherein the polycondensation catalyst comprises: at least one of compounds represented by the following general formula (I) or (II) (hereinafter occasionally referred to as "straight-chain polycondensation catalyst"); and at least one of compounds represented by the following general formula (III) or (IV) (hereinafter occasionally referred to as "branched polycondensation catalyst") and the weight ratio of the total amount of the compounds represented by the following general formula (I) or (II) used to the total amount of the compounds represented by the following general formula (III) or (IV) used is from 5:95 to 95:5:

The first exemplary embodiment of the invention will be further described hereinafter.

(Method for Producing a Binder Resin)

[Polycondensation Step]

The method for producing a binder resin of the invention comprises a step of polycondensing a polycondensable monomer in the following polycondensation catalysts.

Further, the binder resin produced by the method for producing a binder resin of the invention can be used as a binder resin for electrostatic image development toner to advantage.

<Polycondensation Catalyst>

In the method for producing a binder resin for electrostatic image development toner of the invention, as the polycondensation catalysts to be used at the polycondensation step there are used at least one of compounds represented by the general formula (I) or (II) and at least one of compounds represented by the general formula (III) or (IV):

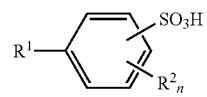 (I)

wherein $R^1$ represents a $C_8$-$C_{20}$ straight-chain alkyl group; $R^2$ represents a monovalent organic group; and the number n of substituents $R^2$ represents an integer of from 0 to 4;

 (II)

wherein $R^3$ represents a $C_8$-$C_{20}$ straight-chain alkyl group;

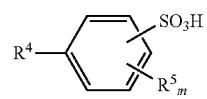 (III)

wherein $R^4$ represents a $C_8$-$C_{20}$ branched alkyl group; $R^5$ represents a monovalent organic group; and the number m of substituents $R^5$ represents an integer of from 0 to 4; and

 (IV)

wherein $R^6$ represents a $C_8$-$C_{20}$ branched alkyl group.

Referring to the amount of the polycondensation catalysts to be used at the aforementioned polycondensation step, the weight ratio of the total amount Wa of the compounds represented by the general formula (I) or (II) used to the total amount Wb of the compounds represented by the general formula (III) or (IV) used is from 5:95 to 95:5, preferably from 15:85 to 85:15, more preferably from 40:60 to 85:15. When the ratio of Wa to Wb falls within the above defined range, the properties of both the straight-chain catalyst and branched catalyst can be fully accomplished, making it possible to suppress the change of reactivity with the amount of the catalysts to advantage.

Two or more of the compounds represented by the general formula (I) or (II) may be used and two or more of the compounds represented by the general formula (III) or (IV) may be used.

In accordance with the method of the first exemplary embodiment for producing a binder resin of the invention, the use of two acid catalysts having different structures, i.e., straight-chain polycondensation catalyst and branched polycondensation catalyst makes it possible to suppress the drop of reactivity with the change of the amount of the catalysts used. This is presumably because the catalyst having a branched aliphatic chain structure to be used with the acid catalyst having a high catalytic capacity having a straight-chain aliphatic chain can fairly entangle with and get compatibilized with the polycondensation products to suppress reverse reaction that would occur if the catalysts are present in a large amount, making it possible to develop polycondensation and accelerate dehydration. On the other hand, when the catalyst having a straight-chain aliphatic chain is present in a large amount, the polymerization degree and the viscosity rise quickly, but the reaction components are less entangled with the catalysts to lower the reactivity. The combined use of the characteristics of the branched acid catalyst and the high reactivity of the straight-chain acid catalyst makes it possible to suppress the change of reactivity with the amount of the catalysts used. These properties can be used to advantage to raise the amount of Brönsted acid catalyst having a surface activity represented any one of by the general formula (I) to (IV) for the purpose of enhancing emulsifiability or to effect underwater polycondensation. The method for producing a binder resin of the invention makes it possible to suppress the drop of reactivity with the change of the amount of catalysts used and thus can be used for the production of a binder in a continuous production process to advantage.

The toner produced from the binder resin prepared in the presence of well-balanced straight-chain polycondensation catalyst and branched polycondensation catalyst can have latex particles dispersed uniformly therein because these catalysts are fairly dispersed in a resin. The toner thus produced has their components little maldistributed therein. During the emulsification and toner production, the toner can be homogenized. In particular, thermal cohesion or blocking attributed to the occurrence of low molecular components or low polymerization degree components can be suppressed.

$R^1$ in the general formula (I) and $R^3$ in the general formula (II) each are a straight-chain alkyl group having from 8 to 20 carbon atoms, preferably from 10 to 20 carbon atoms, more preferably from 12 to 20 carbon atoms, which may have substituents selected from the group of substituents listed later.

$R^4$ in the general formula (III) and $R^6$ in the general formula (IV) each are a branched alkyl group having from 8 to 20 carbon atoms, preferably from 10 to 20 carbon atoms, more preferably from 12 to 20 carbon atoms, which may have substituents selected from the group of substituents listed later. The term "straight-chain alkyl group" as used herein is meant to indicate a non-branched n-alkyl group. The term "branched alkyl group" as used herein is meant to indicate an alkyl group having one or more branches. The branch possessed by the branched alkyl group may have any of comb-shaped structure generically called hard type, normal forked structure and cyclic structure formed by the connection of two or more branched structures.

When the number of carbon atoms in $R^1$, $R^3$, $R^4$ or $R^6$ in the structures of the general formulae (I) to (IV) is smaller than the above defined range, some effects can occur. For example, the polycondensation cannot proceed too much to increase the molecular weight of the product. Further, the distribution of molecular weights can be widened due to the remaining of low molecular components. When the molecular weight of the product is lowered or the distribution of molecular weights is widened due to the occurrence of a large amount of low molecular components, the resulting toner can easily cause offset. The toner thus obtained can exhibit deteriorated powder fluidity, thermal storage properties and grindability.

On the other hand, when the number of carbon atoms in $R^1$, $R^3$, $R^4$ or $R^6$ is greater than the above defined range, these catalysts can be difficultly produced on an industrial basis. At the same time, the resulting catalysts exhibit a low solubility and thus cannot sufficiently exhibit its catalytic capacity.

Further, the number of carbon atoms in $R^1$, $R^3$, $R^4$ or $R^6$ in the structures of the general formulae (I) to (IV) may be distributed. In the catalyst having the structure of the general formula (I), for example, $R^1$ in the main component accounting for 70% by weight or more of the catalyst may have from 13 to 20 carbon atoms. In the distribution of catalyst components, there may be included a catalyst comprising $R^1$ having 12 or less carbon atoms. Such a distribution is an existing fact for industrial products. Referring to the industrially tolerable purity, the concentration of main component is 70% by weight or more, preferably 80% by weight or more, even more preferably 90% by weight or more. The isolation or quantitative determination of these components can be accomplished by, e.g., high speed liquid chromatography.

$R^1$, $R^3$, $R^4$ and $R^6$ each may have substituents selected from the group of substituents listed below. There may be present two or more of these substituents. If possible, these substituents may be substituted by those selected from the group of substituents listed below. Further, two or more of these substituents may be connected to each other to form a cycle. These substituents may contain the aforementioned branched alkyl group. $R^1$, $R^3$, $R^4$ and $R^6$ each are preferably free of substituents other than alkyl group.

(Group of Substituents)

Halogen atoms (fluorine atom, chlorine atom, bromine atom, iodine atom), hydrocarbon groups (alkyl group, alkenyl group, alkinyl group, aryl group, hydrocarbon ring group), heterocyclic groups, alkoxy groups, aryloxy groups, alkoxycarbonyl groups, acyloxy groups, acyl groups, carbamoyl groups, monosubstituted or disubstituted carbamoyl groups, cyano groups, perhalogenloalkyl groups, thiocyanato groups, sulfamoyl groups, alkylsulfinyl groups, arylsulfinyl groups, alkylsulfonyl groups, arylsulfonyl groups, nitro groups, acylamino groups, N-substituted acylamino groups, sulfonylamino groups, N-substituted sulfonylamino groups, amide groups, N-monosubstituted or disubstituted amide groups, sulfonamide groups, N-monosubstituted or disubstituted sulfonamide groups, alkylsulfinyl groups, arylsulfinyl groups, alkylsulfonyl groups, arylsulfonyl groups.

The sulfo group ($—SO_3H$) in the general formula (I) or (III) is connected to the benzene ring on any site other than sites on which $R^1$ or $R^4$ is connected to the benzene ring (any of 2- to 6-positions if the site on which $R^1$ or $R^4$ is connected to the benzene ring is 1-position).

$R^2$ and $R^5$ each are a monovalent organic group. Examples of the monovalent organic group include halogen atoms (fluorine atom, chlorine atom, bromine atom, iodine atom), hydrocarbon groups (alkyl group, alkenyl group, alkinyl group, aryl group, hydrocarbon ring group), heterocyclic groups, alkoxy groups, aryloxy groups, alkoxycarbonyl groups, acyloxy groups, acyl groups, carbamoyl groups, monosubstituted or disubstituted carbamoyl groups, cyano groups, thiocyanato groups, sulfamoyl groups, alkylsulfinyl groups, arylsulfinyl groups, alkylsulfonyl groups, arylsulfonyl groups, nitro groups, acylamino groups, N-substituted acylamino groups, sulfonylamino groups, N-substituted sulfonylamino groups, amide groups, N-monosubstituted or disubstituted amide groups, sulfonamide groups, and N-monosubstituted or disubstituted sulfonamide groups. If possible, these monovalent organic groups may be substituted by monovalent organic groups selected from the aforementioned groups of monovalent organic groups. The substituents, if any, are preferably electrophilic. Examples of these substituents (if necessary) include halogen atoms, alkoxycarbonyl groups, acyloxy groups, acyl groups, carbamoyl groups, monosubstituted or disubstituted carbamoyl groups, cyano groups, perhalogenoalkyl groups, thiocyanato groups, sulfamoyl groups, alkylsulfinyl groups, arylsulfinyl groups, alkylsulfonyl groups, arylsulfonyl groups, nitro groups, alkinyl groups, and aryloxy groups (only m-position).

The number n of substituents $R^2$ represents an integer of from 0 to 4. When n is 0, it means that there is no $R^2$. When n is from 1 to 4, it means that there are from 1 to 4 $R^2$'s. Two or more $R^2$'s, if any, may be each an independent monovalent organic group. The number n of substituents $R^2$ is preferably 0.

The number m of substituents $R^5$ represents an integer of from 0 to 4. When m is 0, it means that there is no $R^5$. When m is from 1 to 4, it means that there are from 1 to 4 $R^5$'s. Two or more $R^5$'s, if any, may be each an independent monovalent organic group. The number m of substituents $R^5$ is preferably 0.

Preferred examples of the catalyst having the structure of the general formula (I) include 4-n-octtylbenzenesulfonic acid, 4-n-nonylbenzenesulfonic acid, 4-n-decylbenzenesulfonic acid, 4-n-undecyl benzenesulfonic acid, 4-n-dodecylbenzenesulfonic acid, 4-n-tridecylbenzenesulfonic acid, 4-n-tetradecyl benzenesulfonic acid, 4-n-pentadecylbenzenesulfonic acid, 4-n-hexadecylbenzenesulfonic acid, 4-n-heptadecylbenzenesulfonic acid, 4-n-octadecylbenzene sulfonic acid, 4-n-nonadecylbenzenesulfonic acid, and 4-n-eicosabenzenesulfonic acid. More desirable among these catalysts are 4-n-dodecylbenzenesulfonic acid, —4-n-pentadecylbenzenesulfonic acid, and 4-n-octadecyl benzenesulfonic acid.

Examples of the catalyst having the structure of the general formula (II) include 1-octanesulfonic acid, 1-nonanesulfonic acid, 1-decanesulfonic acid, 1-undecanesulfonic acid, 1-dodecanesulfonic acid, 1-tridecanesulfonic acid, 1-tetradecanesulfonic acid, 1-pentadecanesulfonic acid, 1-hexadecanesulfonic acid, 1-heptadecanesulfonic acid, 1-octadecanesulfonic acid, 1-nonadecanesulfonic acid, and 1-eicosanesulfonic acid. More desirable among these catalysts are 1-dodecanesulfonic acid, 1-pentadecanesulfonic acid, and 1-octadecanesulfonic acid.

Examples of the catalyst having the structure of the general formula (III) include Tayca Power B120, B121, B124 and B150 (produced by Tayca Corporation), and Lipon LH-9000 (produced by Lion Corporation).

As the catalyst having the structure of the general formula (III) there is preferably used one having the structure of the following general formula (V). In the compound represented by the general formula (V), p is more preferably from 3 to 5.

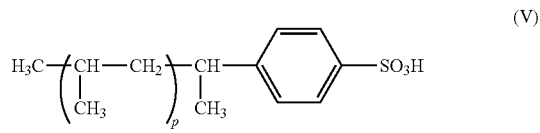

(V)

wherein p represents an integer of from 2 to 5.

As the catalyst having the structure of the general formula (IV) there is preferably used one having the structure of the following general formula (VI). In the compound represented by the general formula (VI), q is more preferably from 3 to 5.

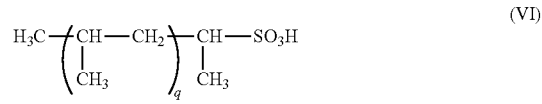

(VI)

wherein q represents an integer of from 2 to 5.

Referring to the polycondensation catalyst, the compound represented by the following general formula (I) or (II) is preferably one represented by the general formula (I).

The compound represented by the general formula (III) or (IV) is preferably one represented by the general formula (III). More preferably, the compound represented by the general formula (I) and the compound represented by the general formula (III) are used in combination.

The total amount of the polycondensation catalysts of the invention (compounds represented by the general formulae (I) to (IV)) is preferably from 0.01 to 30 mol-%, more preferably from 0.05 to 20 mol-% based on the total amount of the polycondensable monomers.

These polycondensation catalysts are not specifically limited and may be produced by any known method or may be any commercially available product. Examples of the aforementioned production method employable herein include a method involving the sulfation of alkane or alkylbenzene and a method involving the substitution of metal moiety of metal salt of alkylbenzenesulfonic acid with hydrogen. As the sulfation method there may be used a method involving the substitution of hydrogen using fuming sulfuric acid or anhydrous sulfuric acid gas. The substitution of metal salt can be accomplished by adding sulfuric acid to a solution of a metal salt of alkylbenzenesulfonic acid in a solvent to cause reaction.

The method of the second exemplary embodiment of the invention for producing a binder resin for electrostatic image development toner (hereinafter occasionally referred to as "binder resin") comprises polycondensing a polyvalent alcohol with a polyvalent carboxylic acid that has a residue group to which carboxyl groups are connected, the residue group having 5 or more carbon atoms, by using a polycondensation catalyst (hereinafter occasionally referred to as "polycondensation step"), wherein as the polycondensation catalyst there is used at least one of compounds represented by the general formulae (I') to (III').

The second exemplary embodiment of the invention will be further described hereinafter.

(Method for Producing a Binder Resin for Electrostatic Image Development Toner)

The production of a polyester by polycondensation is normally effected in the presence of a polycondensation catalyst. A polycondensation catalyst forms an intermediate with a monomer during the reaction to enhance the reactivity, exerting an effect of accelerating the ester synthesis reaction. However, polycondensation catalysts having catalytic activity at low temperatures are limited. One of these polycondensation catalysts is Brönsted acid catalyst, which has heretofore been used. The capacity of a Brönsted acid type catalyst is determined by the balance of an acid which is a catalyst with a lipophilic hydrophobic group moiety which exhibits surface activity. In other words, the acidity of the catalyst governs the direct catalytic capacity and the hydrophobic group moiety affects the compatibility of the catalyst with monomers or oligomers and polymers thus produced to affect indirectly the progress of the reaction. More specifically, The longer the hydrophobic group moiety is and the higher the hydrophobicity is, the greater is the polycondensation reaction site that can be given to the polycondensation system. Taking into account the drape with the surrounding materials, however, the length and shape of the hydrophobic group moiety are somewhat limited. The sulfonic acid group can exhibit its catalytic activity only when such a polycondensation reaction site is formed.

The polycondensation catalysts which can be used in the second exemplary embodiment of the invention have the structures represented by the following general formulae (I') to (III').

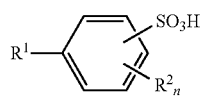
(I')

wherein $R^1$ represents a $C_{13}$-$C_{20}$ alkyl group; $R^2$ represents a group having a Hammett's value of less than 0.2 with sulfo group as reference; and n represents an integer of from 0 to 4;

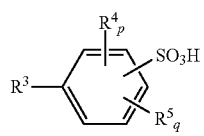
(II')

wherein $R^3$ represents a $C_8$-$C_{20}$ alkyl group; $R^4$ represents a group having a Hammett's value of 0.2 or more with sulfo group as reference; $R^5$ represents a group having a Hammett's value of less than 0.2 with sulfo group as reference; p represents an integer of from 1 to 4; and q represents an integer of from 0 to 3.

 (III')

wherein $R^6$ represents a $C_{10}$-$C_{20}$ alkyl group.

In the general formula (I'), $R^1$ represents a $C_{13}$-$C_{20}$ alkyl group which may be branched. The number of carbon atoms in the alkyl group $R^1$ is preferably from 15 to 20. The alkyl group $R^1$ may have substituents selected from the group of substituents listed later.

In the general formula (II'), $R^3$ represents a $C_8$-$C_{20}$ alkyl group which may be branched. The number of carbon atoms in the alkyl group $R^3$ is preferably from 10 to 20, more preferably from 12 to 20. The alkyl group $R^3$ may have substituents selected from the group of substituents listed later.

In the general formula (III'), $R^6$ represents a $C_{10}$-$C_{20}$ alkyl group which may be branched. The number of carbon atoms in the alkyl group $R^6$ is preferably from 12 to 20. The alkyl group $R^6$ may have substituents selected from the group of substituents listed later.

In the structures of the general formulae (I') to (III'), when the number of carbon atoms in $R^1$, $R^3$ or $R^6$ is smaller than the above defined range, adverse effects can be exerted such as insufficient progress of polycondensation that prevents the rise of molecular weight and widening of molecular weight distribution due to the remaining of low molecular components. When the molecular weight distribution is widened due to the presence of low molecular components in a large amount, the resulting toner can easily cause hot offset during fixing. Further, the toner thus obtained can exhibit deteriorated powder fluidity, thermal storage properties and grindability.

On the other hand, when the number of carbon atoms in $R^1$, $R^3$ or $R^6$ is greater than the above defined range, these catalysts can be difficultly produced stably on an industrial basis. At the same time, the resulting catalysts exhibit a low solubility and thus cannot sufficiently exhibit its catalytic capacity.

Further, the structure of the hydrocarbon group $R^1$, $R^3$ or $R^6$ in these catalysts is not limited and may be straight-chain or branched. The branch may have any of comb-shaped structure generically called hard type, normal forked structure and cyclic structure formed by the connection of two or more branched structures.

Moreover, $R^1$, $R^3$ or $R^6$ in the catalysts of the invention may have some distribution. In the catalyst having the structure of general formula (I'), for example, it suffices if the maximum number of carbon atoms in $R^1$ in the catalyst is from 13 to 20. In the distribution of catalytic components, those having $R^1$ having 12 or less carbon atoms may be included. It is an existing fact for industrial products that such a distribution is established. Referring to normally industrially tolerable purity, 25% by weight or more of the catalytic components preferably have R1 having from 13 to 20 carbon atoms. The isolation and quantitative determination of these catalytic components can be conducted by, e.g., high speed liquid chromatography.

$R^1$, $R^3$ and $R^6$ may have substituents selected from the group of substituents listed below. Two or more of these substituents may be contained in $R^1$, $R^3$ and $R^6$. If possible, these substituents may be substituted by substituents selected from the group of substituents listed below. Further, two or more of these substituents may be connected to each other to form a ring. The aforementioned substituents may contain the aforementioned branched alkyl structure.

(Group of Substituents)

Halogen atoms (fluorine atom, chlorine atom, bromine atom, iodine atom), hydrocarbon groups (alkyl group, alkenyl group, alkinyl group, aryl group, hydrocarbon ring group), heterocyclic groups, alkoxy groups, aryloxy groups, alkoxycarbonyl groups, acyloxy groups, acyl groups, carbamoyl groups, monosubstituted or disubstituted carbamoyl groups, cyano groups, perhalogenloalkyl groups, thiocyanato groups, sulfamoyl groups, alkylsulfinyl groups, arylsulfinyl groups, alkylsulfonyl groups, arylsulfonyl groups, nitro groups, acylamino groups, N-substituted acylamino groups, sulfonylamino groups, N-substituted sulfonylamino groups, amide groups, N-monosubstituted or disubstituted amide groups, sulfonamide groups, N-monosubstituted or disubstituted sulfonamide groups, alkylsulfinyl groups, arylsulfinyl groups, alkylsulfonyl groups, arylsulfonyl groups, alkylidene groups.

The sulfo group ($—SO_3H$) in the general formula (I') or (II') is connected to the benzene ring on any site other than sites on which $R^1$ or $R^3$ is connected to the benzene ring (any of 2- to 6-positions if the site on which $R^1$ or $R^3$ is connected to the benzene ring is 1-position).

The catalyst having the structure of the general formula (II') has at least one group ($R^4$) having a Hammett's value of 0.2 or more other than sulfonic acid group (sulfo group, $—SO_3H$) on the benzene ring. Hammett's value is a substituent constant determined by the Hammett's rule which is an empirical rule advocated to quantitatively discuss the influence of substituents on the reaction or equilibrium of benzene derivatives. The propriety of this rule is now widely recognized. These values can be found in many general books. For details, reference can be made to J. A. Dean, "Lang's Handbook of Chemistry", 12th Ed. and "Kagaku Binran-Kisohen Kaitei 5-han (Chemical Handbook-Elementary Edition, Revised 5th Ed.)", The Chemical Society of Japan.

The groups having a Hammett's value of 0.2 or more of the invention do not mean only substituents having known Hammett's values disclosed in these references but include those which is expected to have a Hammett's value of 0.2 or more when measured according to Hammett's rule.

Hammett's value σ is determined from the reaction rate of unsubstituted phenylacetic acid and substituted phenylacetic acid using the dissociation constant of phenylacetic acid in 25° C. water.

$$\sigma = \log (Ka/Ka^0) = pKa^0 - pKa$$

For the values of pKa used in the invention, reference can be made to "Kagaku Binran-Kisohen Kaitei 5-han (Chemical Handbook-Elementary Edition, Revised 5th Ed.)", The Chemical Society of Japan, pp. II-379-381, 2004 (published by Maruzen Co., Ltd.). Reference can made also to C. Hansh et al, "Chemical Reviews", vol. 91, p. 165-195 (1991) and literates cited therein.

A substituent having a Hammett's value of 0.2 or more exhibits a high electrophilicity. A catalyst having such a substituent on the benzene ring has an enhanced acidity. A Brönsted acid type catalyst having an enhanced acidity can exhibit an enhanced catalytic activity.

Examples of groups having a Hammett's value of 0.2 or more include halogen atoms, alkoxycarbonyl groups, acyloxy groups, acyl groups, carbamoyl groups, monosubstituted or disubstituted carbamoyl groups, cyano groups, perhalogenoalkyl groups, thiocyanate groups, sulfamoyl groups, alkylsulfinyl groups, arylsulfinyl groups, alkylsulfonyl groups, arylsulfonyl groups, nitro groups, alkinyl groups, and aryloxy groups (only m-position).

Specific examples of groups having a Hammett's value of 0.2 or more include fluorine atom, chlorine atom, bromine atom, iodine atom, methoxycarbonyl group, ethoxycarbonyl group, acetoxy group, propionyl group, acetyl group, benzoyl group, formyl group, trifluoroacetyl group, carbamoyl group, cyano group, trifluoromethyl group, thiocyanate group, and nitro group. Particularly preferred among these groups are fluorine atom, chlorine atom, bromine atom and iodine atom taking into account the substituent effect, adaptability to polycondensation catalyst and adaptability to toner binder resin.

The number p of substituents in $R^4$ represents an integer of from 1 to 4. When p is from 1 to 4, it means that there are from 1 to 4 $R^4$'s. When there are two or more $R^4$'s, groups having a Hammett's value of 0.2 or more can be independently selected.

The position at which $R^4$ is connected to the benzene ring is not specifically limited so far as the group and bonding position are such that a Hammett's value of 0.2 or more with sulfo group as reference can be established. The bonding position may be any of 2- to 6-positions except the bonding position of $R^3$ if the sulfo group is at 1-position.

$R^2$ in the general formula (I') and $R^5$ in the general formula (II') each are a group having a Hammett's value of 0.2 or more with sulfonyl group as reference and can be connected to the benzene at any position.

The number n of substituents in $R^2$ represents an integer of from 0 to 4. When n is from 1 to 4, it means that there are from 1 to 4 $R^2$'s. When there are two or more $R^2$'s, monovalent organic groups can be independently selected. The number n of substituents in $R^2$ is preferably 0.

The number q of substituents in $R^5$ represents an integer of from 0 to 3. When q is 0, it means that there is no $R^5$. When q is from 1 to 3, it means that there are from 1 to 3 $R^5$'s. When there are two or more $R^5$'s, monovalent organic groups can be independently selected. The number q of substituents in $R^5$ is preferably 0.

$R^2$ or $R^5$ may be a group having a Hammett's value of less than 0.2. Examples of such a group include hydrocarbon groups (e.g., alkyl group, alkenyl group, alkinyl group, aryl group, hydrocarbon ring), heterocyclic groups; alkoxy groups, aryloxy groups, acylamino groups, N-substituted acylamino groups, sulfonylamino groups, N-substituted sulfonylamino groups, amide groups, N-monosubstituted or disubstituted amide groups, sulfonamide groups, and N-monosubstituted or disubstituted sulfonamide groups. Preferred among these groups are electrophilic groups having a Hammett's value of from not smaller than 0 to less than 0.2 from the standpoint of reactivity of catalyst.

In the general formula (II'), the sum of Hammett's value of all $R^5$'s with sulfonyl group as reference is preferably positive. In other words, all $R^5$'s are electrophilic with respect to sulfo group as a whole.

The catalyst having the structure of the general formula (I') is not specifically limited. Examples of such a catalyst, if $R^1$ is straight-chain, include tridecylbenzenesulfonic acid, tetradecylbenzene sulfonic acid, pentadecylbenzenesulfonic acid, hexadecylbenzenesulfonic acid, heptadecylbenzene sulfonic acid, octadecylbenzenesulfonic acid, nonanedecylbenzenesulfonic acid, eicosylbenzene sulfonic acid, and so-called hard type version thereof. The alkyl group moiety represented by R1 may have a branched structure other than hard type structure or may have substituents.

These catalysts can be produced, e.g., by sulfating alkylbenzene or substituting the metal moiety of metal salt of alkylbenzenesulfonic acid with hydrogen. As the sulfation method there may be used a method involving the substitution of hydrogen using fuming sulfuric acid or anhydrous sulfuric acid gas. The substitution of metal salt can be accomplished by adding sulfuric acid to a solution of a metal salt of alkylbenzenesulfonic acid in a solvent to cause reaction.

Examples of the catalyst having the structure of the general formula (III) include o-fluoro-p-octylbenzenesulfonic acid, m-fluoro-p-octylbenzene sulfonic acid, o-fluoro-p-decylbenzenesulfonic acid, m-fluoro-p-decylbenzenesulfonic acid, o-fluoro-p-dodecylbenzenesulfonic acid, m-fluoro-p-dodecyl benzenesulfonic acid, o-fluoro-p-pentadecylbenzene sulfonic acid, m-fluoro-p-pentadecylbenzenesulfonic acid, o-fluoro-p-octadecylbenzenesulfonic acid, m-fluoro-p-octadecylbenzenesulfonic acid, o-chloro-p-octlbenzenesulfonic acid, m-chloro-p-octylbenzene sulfonic acid, o-chloro-p-decylbenzenesulfonic acid, m-chloro-p-decylbenzenesulfonic acid, o-chloro-p-dodecylbenzenesulfonic acid, m-chloro-p-dodecyl benzenesulfonic acid, o-chloro-p-pentadecylbenzene sulfonic acid, m-chloro-p-pentadecylbenzenesulfonic acid, o-chloro-p-octadecylbenzenesulfonic acid, and m-chloro-p-octadecylbenzenesulfonic acid. These substituents can be added to the benzene ring, e.g., by reacting an alkylbenzene with a known halogenating agent such as halogenated metal and halogenic acid salt (e.g., potassium fluorophosphate) to prepare a halogenated alkylbenzene having halogen atom incorporated therein on the benzene ring, and then sulfonating the halogenated alkylbenzene or by reacting an alkylbenzenesulfonate with the aforementioned halogenide, and then converting the reaction product back to an acid. In this structure, the alkyl moiety represented by $R^4$ may be in any of straight-chain form, branched form, comb-shaped form. The alkyl moiety may have substituents.

Examples of the catalyst having the structure of the general formula (III') include decanesulfonic acid, dodecanesulfonic acid, hexadecanesulfonic acid, pentadecanesulfonic acid, and octadecanesulfonic acid. However, the invention is not limited to these compounds. This catalyst is not limited in the structure of alkyl moiety. The alkyl moiety may be in any of straight-chain form, branched form, comb-shaped form. The alkyl moiety may have substituents.

Among the aforementioned catalysts having the structures of the general formulae (II) to (III'), preferred catalysts having the structure of the general formula (I') are soft type (straight-chain type) and hard type (comb-shaped type) pentadecylbenzenesulfonic acid and octadecylbenzenesulfonic acid. Preferred among the catalysts having the structure of the general formula (II') are o-fluoro-p-octylbenzenesulfonic acid, m-fluoro-p-octylbenzenesulfonic acid, o-fluoro-p-dodecylbenzenesulfonic acid, m-fluoro-p-dodecyl benzenesulfonic acid, o-fluoro-p-pentadecylbenzene sulfonic acid, m-fluoro-p-pentadecylbenzenesulfonic acid, o-fluoro-p-octadecylbenzenesulfonic acid, m-fluoro-p-octadecylbenzenesulfonic acid, o-chloro-p-dodecylbenzenesulfonic acid, and m-chloro-p-dodecyl benzenesulfonic acid. Preferred among the catalysts having the structure of the general formula (III') are decanesulfonic acid, dodecanesulfonic acid, pentadecanesulfonic acid, and octadecanesulfonic acid.

Particularly preferred among these catalysts are soft type (straight-chain type) and hard type (comb-shaped type) pentadecylbenzenesulfonic acid and octadecylbenzenesulfonic acid, o-fluoro-p-dodecyl benzenesulfonic acid, m-fluoro-p-dodecylbenzene sulfonic acid, o-fluoro-p-pentadecylbenzenesulfonic acid, m-fluoro-p-pentadecylbenzenesulfonic acid, o-fluoro-p-octadecylbenzenesulfonic acid, m-fluoro-p-octadecylbenzenesulfonic acid, pentadecanesulfonic acid, and octadecanesulfonic acid.

<Polycondensable Monomer>

The polycondensable monomer to be used in the first exemplary embodiment of the invention is not specifically limited. Any polycondensable monomer may be used so far as it is used for various polymerization methods described later. For details, reference will be made below.

The polycondensable monomer to be used in the first exemplary embodiment of the invention is not specifically limited and may be any of crystalline polymers and amorphous polymers, preferably a monomer constituting any of amorphous polymers.

Examples of the polycondensable monomer employable herein include aliphatic, alicyclic and aromatic polyvalent carboxylic acids, alkylesters and polyvalent alcohols thereof, ester compounds thereof, hydroxycarboxylic acid compounds. The polycondensable monomers can be polymerized by direct esterification reaction, ester exchange reaction or the like to obtain a polycondensed resin.

The polyvalent alcohol is a compound having two or more hydroxyl groups per molecule. The polyvalent alcohol to be used herein is not specifically limited but may be any of the following monomers.

A diol is a compound having two hydroxyl groups per molecule. Examples of the diol include propanediol, butanediol, pentanediol, hexanediol, heptanediol, octanediol, nonanediol, decanediol, dodecanediol, tetradecanedill, and octadecanediol.

Examples of the polyvalent ol other than diol include glycol, pentaerythritol, hexamethylol melamine, hexaethylol melamine, tetramethylol benzoguanamine, and tetraethylol benzoguanamine.

Examples of the polyvalent alcohol having a cyclic structure include the following monomers. For example, cyclohexanediol, cyclohexanedimethanol, bisphenol A, bisphenol C, bisphenol E, bisphenol F, bisphenol P, bisphenol S, bisphenol Z, hydrogenated bisphenol, biphenol, naphthalenediol, 1,3-adamanthanediol, 1,3-adamanthanedimethanol, 1,3-adamanthanediethanol, and hydroxyphenyl cyclohexane may be exemplified, but the invention is not limited thereto. In the invention, the aforementioned bisphenols each preferably have at least one alkylene oxide group. Examples of the alkylene oxide group employable herein include ethylene oxide group, propylene oxide group, and butylene oxide group, but the invention is not limited thereto. Preferred among these alkylene oxide groups are ethylene oxide and propylene oxide. The added number of mols of these alkylene oxide groups is preferably from 1 to 3. When this value falls within the above defined range, the resulting polyester can be properly controlled in its viscoelasticity and glass transition temperature so that it can be used as a toner.

Those which can be preferably used among the aforementioned monomers are hexanediol, cyclohexanediol, octanediol, decanediol, dodecanediol, and alkylene oxide adducts of bisphenol A, bisphenol C, bisphenol E, bisphenol S and bisphenol Z.

The polyvalent carboxylic acid to be used as a monomer in the polycondensation is a compound having two or more carboxyl groups per molecule. Among these polyvalent carboxylic acids, dicarboxylic acid is a compound having two or more carboxyl groups per molecule. Examples of the dicarboxylic acid include oxalic acid, succinic acid, fumaric acid, maleic acid, adipic acid, β-methyladipic acid, malic acid, malonic acid, pimelic acid, tartaric acid, azelaic acid, pimelic acid, sebasic acid, nonanedicarboxylic acid, decanedicarboxylic acid, undecanedicarboxylic acid, dodecanedicarboxylic acid, citraconic acid, cyclohexane-3,5-diene-1,2-carboxylic acid, citric acid, hexahydroterephthalic acid, mucic acid, phthalic acid, isophthalic acid, terephthalic acid, tetrachlorophthalic acid, chlorophthalic acid, nitrophthalic acid, p-carboxyphenylacetic acid, p-phenylenediacetic acid, m-phenylenediacetic acid, p-phenylenedipropionic acid, m-phenylenedipropionic acid, m-phenylenediglycolic acid, p-phenylnediglycolic acid, O-phenylenediglycolic acid, diphenylacetic acid, diphenyl-p,p'-dicarboxylic acid, 1,1-cyclopentene dicarboxylic acid, 1,4-cyclohexanedicarboxylic acid, 1,3-cyclohexanedicarboxylic acid, 1,2-cyclohexane dicarboxylic acid, 1,2-cyclohexenedicarboxylic acid, norbornene-2,3-dicarboxylic acid, 1,3-adamanthane dicarboxylic acid, 1,3-adamanthanediacetic acid, naphthalene-1,4-dicarboxylic acid, naphthalene-1,5-dicarboxylic acid, naphthalene-2,6-dicarboxylic acid, and anthracenedicarboxylic acid.

Examples of the polyvalent carboxylic acid other than dicarboxylic acid include trimellitic acid, pyromellitic-acid, naphthalenetricarboxylic acid, naphthalenetetracarboxylic acid, pyrenetricarboxylic acid, and pyrenetetracarboxylic acid.

The aforementioned carboxylic acids may have functional groups other than carboxyl group. As these carboxylic acids there may be used carboxylic acid derivatives such as acid anhydride and acid ester.

The monomers which can be preferably used among these polyvalent carboxylic acids are sebasic acid, nonanedicarboxylic acid, decanedicarboxylic acid, undecanedicarboxylic acid, dodecanedicarboxylic acid, p-phenylenediacetic acid, m-phenylenediacetic acid, p-phenylenedipropionic acid, m-phenylenedipropionic acid, 1,4-cyclohexanedicarboxylic acid, 1,3-cyclohexane dicarboxylic acid, naphthalene-1,4-dicarboxylic acid, naphthalene-1,5-dicarboxylic acid, naphthalene-2,6-dicarboxylic acid, trimellitic acid, and pyromellitic acid.

Further, a hydroxycarboxylic acid compound containing carboxylic acid and hydroxyl group per molecule can be subjected to polycondensation. Examples of the hydroxycarboxylic acid compound employable herein include hydroxyoctanic acid, hydroxynonanic acid, hydroxydecanic acid, hydroxyundecanic acid, hydroxydodecanic acid, hydroxytetradecanic acid, hydroxytridecanic acid, hydroxyhexadecanic acid, hydroxypentadecanic acid, and hydroxystearic-acid. However, the invention is not limited to these compounds.

In the second exemplary embodiment of the invention, as the polyester monomers there are used a polyvalent alcohol and a polyvalent carboxylic acid. In particular, when the number of carbon atoms in the residue to which the carboxyl groups in the polyvalent carboxylic acid is connected is 5 or more, the resulting toner binder resin exhibits good properties. When the number of carbon atoms in the residue to which the carboxyl groups in the polyvalent carboxylic acid is connected is 5 or less, the monomer has too high a hydrophilicity, occasionally preventing the progress of dehydration polycondensation at low temperatures. The resulting toner binder resin, if used as such, has too much ester bonds in the polymer, occasionally having an adverse effect on the chargeability and toner viscoelasticity.

The term "residue to which the carboxyl groups in the polyvalent carboxylic acid is connected" as used herein is meant to indicate the moiety obtained by removing carboxyl group (—COOH) from polyvalent carboxylic acid. By way of example, the residue to which the carboxyl groups in 1,4-cyclohexyldicarboxylic acid is connected is 1,4-cyclohexylene.

The number of carbon atoms in the polyvalent alcohol is 5 or more. When the number of carbon atoms in the polyvalent alcohol is 5 or more, it is advantageous in that dehydration polycondensation can be efficiently effected at low temperatures and the stability of particles in water is good.

Preferred examples of the monomer include polyvalent alcohols and polyvalent carboxylic acids the alkyl chain of which have from 5 to 25 carbon atoms.

The polyvalent alcohol is a compound having two or more hydroxyl groups per molecule. The polyvalent alcohol to be used herein is not specifically limited but may be any of the following monomers.

A diol is a compound having two hydroxyl groups per molecule. Examples of the diol include propanediol, butanediol, pentanediol, hexanediol, heptanediol, octanediol, nonanediol, decanediol, dodecanediol, tetradecanedill, and octadecanediol.

Examples of the polyvalent ol other than diol include glycol, pentaerythritol, hexamethylol melamine, hexaethylol melamine, tetramethylol benzoguanamine, and tetraethylol benzoguanamine. Preferred among the polyvalent alcohols having 5 or more carbon atoms are pentanediol, hexanediol, heptanediol, octanediol, nonanediol, decanediol, dodecanediol, tetradecanediol, octadecanediol, pentaeryhthritol, hexamethylol melamine, hexaethylol melamine, tetramethylol benzoguanamine, and tetraethylol benzoguanamine.

As the polyvalent alcohol having a cyclic structure there may be used the following monomer. For example, cyclohexanediol, cyclohexanedimethanol, bisphenol A, bisphenol C, bisphenol E, bisphenol F, bisphenol P, bisphenol S, bisphenol Z, hydrogenated bisphenol, biphenol, naphthalenediol, adamanthenediol or the like may be exemplified, but the invention is not limited thereto. In the invention, the aforementioned bisphenols each preferably have at least one alkylene oxide group. As the alkylene oxide group there may be used ethylene oxide group, propylene oxide group, butylene oxide group or the like, but the invention is not limited thereto. Preferred among these alkylene oxides are ethylene oxide and propylene oxide. The number of added mols of these alkylene oxides is preferably from 1 to 3. When the number of added mols of these alkylene oxides falls within the above defined range, the viscoelasticity or glass transition temperature of the polyester thus prepared can be so properly controlled that it can be used as a toner.

Preferred among these monomers are hexanediol, cyclohexanediol, octanediol, decanediol, dodecanediol, and alkylene oxide adducts of bisphenol A, bisphenol C, bisphenol E, bisphenol S and bisphenol Z.

The polyvalent carboxylic acid which can be used as a monomer to be used in polycondensation is a compound the number of carbon atoms in the residue to which the carboxyl groups in which is 5 or more and which contains two or more carboxyl groups per molecule. Examples of the dicarboxylic acid the number of carbon atoms in the residue to which the carboxyl groups in which is 5 or more include azelaic acid, pimelic acid, sebasic acid, nonanedicarboxylic acid, decanedicarboxylic acid, undecanedicarboxylic acid, dodecanedicarboxylic acid, citraconic acid, cyclohexane-3,5-diene-1,2-carboxylic acid, citric acid, hexahydroterephthalic acid, mucic acid, phthalic acid, isophthalic acid, terephthalic acid, tetrachlorophthalic acid, chlorophthalic acid, nitrophthalic acid, p-carboxyphenylacetic acid, p-phenylenediacetic acid, m-phenylenediacetic acid, p-phenylenedipropionic acid, m-phenylenedipropionic acid, m-phenylenediglycolic acid, p-phenylenediglycolic acid, 0-phenylenediglycolic acid, diphenylacetic acid, diphenyl-p,p'-dicarboxylic acid, 1,1-cyclopentene dicarboxylic acid, 1,4-cyclohexanedicarboxylic acid, 1,3-cyclohexanedicarboxylic acid, 1,2-cyclohexane dicarboxylic acid, 1,2-cyclohexenedicarboxylic acid, norbornene-2,3-dicarboxylic acid, adamanthane dicarboxylic acid, naphthalene-1,4-dicarboxylic acid, naphthalene-1,5-dicarboxylic acid, naphthalene-2,6-dicarboxylic acid, and anthracenedicarboxylic acid.

Examples of the polyvalent carboxylic acid other than dicarboxylic acid include trimellitic acid, pyromellitic acid, naphthalenetricarboxylic acid, naphthalenetetracarboxylic acid, pyrenetricarboxylic acid, and pyrenetetracarboxylic acid.

The aforementioned carboxylic acids may have functional groups other than carboxyl group. As these carboxylic acids there may be used carboxylic acid derivatives such as acid anhydride and acid ester.

The monomers which can be preferably used among these polyvalent carboxylic acids are sebasic acid, nonanedicarboxylic acid, decanedicarboxylic acid, undecanedicarboxylic acid, dodecanedicarboxylic acid, p-phenylenediacetic acid, m-phenylenediacetic acid, p-phenylenedipropionic acid, m-phenylenedipropionic acid, 1,4-cyclohexanedicarboxylic acid, 1,3-cyclohexane dicarboxylic acid, naphthalene-1,4-dicarboxylic acid, naphthalene-1,5-dicarboxylic acid, naphthalene-2,6-dicarboxylic acid, trimellitic acid, and pyromellitic acid.

A compound containing a carboxylic acid and a hydroxyl group per molecule may be additionally subjected to polycondensation. Examples of such a compound include hydroxyoctanoic acid, hydroxynonanoic acid, hydroxydecanoic acid, hydroxyundecanoic acid, hydroxydodecanoic acid, hydroxytetradecanoic acid, hydroxytridecanoic acid, hydroxyhexadecanoic acid, hydroxypentadecanoic acid, and hydroxystearic acid. However, the invention is not limited to these compounds.

In the first and second exemplary embodiments of the invention, any of the aforementioned monomers can be used without any limitation, but the polyester thus produced is preferably amorphous. An amorphous polyester has a high hardness at ordinary temperature and thus exhibits properties which are very suitable for toner from the standpoint of inhibition of offset, low temperature fixability, image quality, etc. A crystalline polyester mainly composed of straight-chain monomers exhibits sharp melt properties attributed to crystallinity to great advantage from the standpoint of low temperature fixability but exhibits poor powder fluidity and image strength to disadvantage. The binder resin as main component is preferably amorphous. The identification of amorphous form can be accomplished by judging to see if the binder resin has glass transition temperature and melting point by differential thermal analysis (DSC) of the polyester thus prepared.

The term "glass transition point of amorphous resin" as used herein is meant to indicate the value measured by the method (DSC method) defined in ASTM D3418-82.

The term "crystalline" as in the aforementioned "crystalline polyester resin" is meant to indicate that differential scanning calorimetry (DSC) shows a definite endothermic peak rather than stepwise endothermic change. Specifically, the half width of the endothermic peak measured at a temperature rising rate of 10° C./min is 6° C. or less.

On the other hand, a resin the half width of endothermic peak of which is more than 6° C. or a resin showing no definite endothermic peak means an amorphous resin.

Examples of the monomers constituting the amorphous polyester among the aforementioned monomers include polyvalent alcohols such as alkylene oxide adducts of bisphenol A, bisphenol C, bisphenol E, bisphenol S and bisphenol Z, and polyvalent carboxylic acids such as p-phenylenediacetic acid, m-phenylene diacetic acid, p-phenylnedipropionic acid, m-phenylene diacetic acid, m-phenylenediacetic acid, 1,4-cyclohexanedicarboxylic acid, 1,3-cyclohexane dicarboxylic acid, naphthalene-1,4-dicarboxylic acid, naphthalene-1,5-dicarboxylic acid, naphthalene-2,6-dicarboxylic acid, trimellitic acid, and pyromellitic acid.

The binder resin obtained by the method for producing a binder resin of the invention is not specifically limited in its structure but is preferably a polyester. Preferably, 90% or more of the repeating units in the polyester is a resin having the following Unit-A, Unit-B and/or Unit-C structure. More preferably, 90% or more of the repeating units in the polyester is a resin having the following Unit-A or Unit-B. Referring to these structures, the resin of Unit-A, for example, may have only one structure represented by Unit-A or two or more structures represented by Unit-A in admixture. This can apply also to the following various Unit structures. The aforementioned binder resin is preferably an amorphous resin. The explanations below are applied to both of the first and second exemplary embodiments unless otherwise noted.

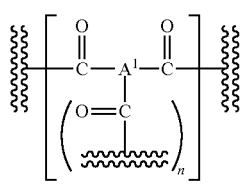

Unit-A

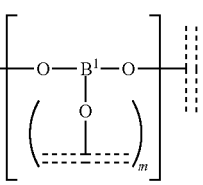

Unit-B

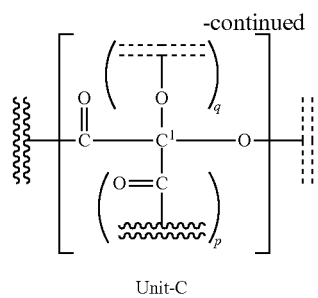

Unit-C

On the first exemplary embodiment, in Unit-A, $A^1$ represents a polyvalent hydrocarbon group which may contain connecting groups. The number n of carboxy bonding sites represents an integer of 0 or more.

On the second exemplary embodiment, in Unit-A, $A^1$ represents a polyvalent hydrocarbon group having 5 or more carbon atoms which may contain connecting groups. The number n of carboxy bonding sites represents an integer of 0 or more.

In Unit-B, $B^1$ represents a polyvalent hydrocarbon group which may contain connecting groups or a group having one or more alkylene oxide groups connected to the hydrocarbon group. The number m of alkoxy bonding sites represents an integer of 0 or more.

In Unit-C, $C^1$ represents a polyvalent hydrocarbon group which may contain connecting groups or a group having one or more alkylene oxide groups connected to the hydrocarbon group. The number p of alkoxy bonding sites represents an integer of 0 or more. The number q of alkoxy bonding sites represents an integer of 0 or more.

The double wavy line and double dotted line in Unit-A to C each indicate the site at which the structure is connected to other structures. The double wavy line portion may be connected to the double dotted line in Unit-B, etc. or structures other than Unit-A to C and Unit-D and E described later. The double dotted line portion may be connected to the double wavy line portion or structures other than other than Unit-A to C and Unit-D and E described later. The double wavy line portions and the double dotted line portions are not connected to each other, respectively.

In the first exemplary embodiment, $A^1$ preferably has 3 or more carbon atoms and $B^1$ preferably has 5 or more carbon atoms.

In the second exemplary embodiment, $B^1$ preferably has 5 or more carbon atoms.

The alkylene oxide group in $B^1$ and $C^1$ may comprise two or more alkylene oxide groups connected to each other. In this case, two or more different alkylene oxide groups may be connected to each other. In the first exemplary embodiment, the alkylene oxide group is connected directly to the alkoxy group moiety. The number of alkylene oxide groups connected to the both ends of the alkoxy group moiety are preferably the same.

Examples of the polyvalent hydrocarbon group which may contain connecting groups include alkane, alkene, alkyne, group obtained by excluding two or more hydrogen atoms from aromatic hydrocarbon or hydrocarbon ring, group comprising two or more of these groups connected to each other, and group comprising two or more of these groups some of which are connecting groups connected to each other.

The aforementioned alkane, alkene and alkyne each may be straight-chain or branched. These polyvalent hydrocarbon groups each preferably have from 1 to 20 carbon atoms.

The aromatic hydrocarbon and hydrocarbon ring may have an alkyl group, alkenyl group and/or alkinyl group incorporated in the cyclic structure or may have two or more cycles connected to each other. In the first exemplary embodiment, the number of carbon atoms in the aromatic hydrocarbon is preferably from 6 to 30, and the number of carbon atoms in the hydrocarbon ring is preferably from 3 to 20, more preferably from 5 to 12, even more preferably from 6 to 8. In the second exemplary embodiment, the number of carbon atoms in the aromatic hydrocarbon is preferably from 6 to 20, and the number of carbon atoms in the hydrocarbon ring is preferably from 3 to 20, more preferably from 5 to 12, even more preferably from 6 to 8.

Preferred examples of the aforementioned connecting group include —O—, —S—, —SO—, and —SO$_2$—. More desirable among these connecting groups are —O— and —SO$_2$—.

In the first exemplary embodiment, preferred examples of B$^1$ include bisphenol A structure (—C$_6$H$_4$—C(CH$_3$)$_2$—C$_6$H$_4$—), bisphenol E structure (—C$_6$H$_4$—C(CH$_2$)—C$_6$H$_4$—), bisphenol F structure (—C$_6$H$_4$—CH$_2$—C$_6$H$_4$—), bisphenol P structure (—C(CH$_3$)$_2$-1,4-C$_6$H$_4$—C(CH$_3$)$_2$—), bisphenol M structure (—C(CH$_3$)$_2$-1,3-C$_6$H$_4$—C(CH$_3$)$_2$—), bisphenol S structure (—C$_6$H$_4$—SO$_2$—C$_6$H$_4$—), bisphenol Z structure (—C$_6$H$_4$—C$_6$H$_{10}$—C$_6$H$_4$—), and group having one or more alkylene oxide groups connected thereto. More desirable among these groups are —C$_6$H$_4$—C(CH$_3$)$_2$—C$_6$H$_4$—, —C$_6$H$_4$—SO$_2$—C$_6$H$_4$—, —C$_6$H$_4$—C$_6$H$_{10}$—C$_6$H$_4$—, and group having one or more alkylene oxide groups connected thereto.

The number n of carboxy bonding sites in Unit-A is preferably from 0 to 5, more preferably from 0 to 2.

The number m of carboxy bonding sites in Unit-B is preferably from 0 to 5, more preferably from 0 to 2.

The number p of carboxy bonding sites in Unit-C is preferably from 0 to 5, more preferably 0.

The number q of carboxy bonding sites in Unit-C is preferably from 0 to 5, more preferably 0.

When n, m, p and q each are 0, it means that there is no carboxy bonding site or alkoxy bonding site in the parenthesis. When n, m, p and q each are an integer of 1 or more, it means that there are carboxy bonding sites or alkoxy bonding sites in an integer of 1 or more in the parenthesis.

In the binder resin obtained by the method in the first and second exemplary embodiments for producing a binder resin of the invention, 90% or more of the repeating units of Unit-A to C is a resin having the following Unit-AB structure.

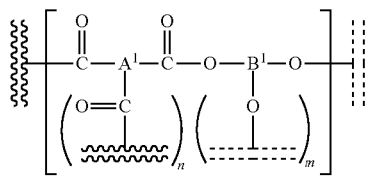

Unit-AB

In Unit-AB, A$^1$ represents a polyvalent hydrocarbon group which may contain connecting groups in the first exemplary embodiment, and A$^1$ represents a polyvalent hydrocarbon group having 5 or more carbon atoms which may contain connecting groups in the second exemplary embodiment. B$^1$ represents a polyvalent hydrocarbon group which may contain connecting groups or a group having one or more alkylene oxide groups connected to the hydrocarbon group, the number n of carboxy bonding sites represents an integer of 0 or more and the number m of alkoxy bonding sites represents an integer of 0 or more. The double wavy line portion and the double dotted line portion each represent a site at which the structure is connected to other structures. The double wavy line portion may be connected to the double dotted line portion or structures other than Unit-A to E. The double dotted line portion may be connected to the double wavy line portion or structures other than Unit-A to E. The double wavy line portions and the double dotted line portions are not connected to each other, respectively.

A$^1$, B$^1$, n and m in Unit-AB are as defined in Unit-A or B, including their preferred ranges.

Unit-A is preferably Unit-D as shown below.

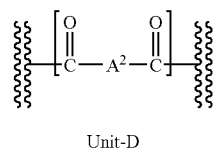

Unit-D

On the first exemplary embodiment, in Unit-D, A$^2$ represents a group-obtained by excluding two or more hydrogen atoms from C$_1$-C$_{20}$ alkane, C$_6$-C$_{20}$ aromatic hydrocarbon or C$_3$-C$_{20}$ hydrocarbon ring or a group having two or more of these groups connected to each other.

On the second exemplary embodiment, in Unit-D, A$^2$ represents a group having 5 or more carbon atoms obtained by excluding two or more hydrogen atoms from C$_5$-C$_{20}$ alkane, C$_6$-C$_{20}$ aromatic hydrocarbon or C$_5$-C$_{20}$ hydrocarbon ring or a group having 5 or more carbon atoms having two or more groups obtained by excluding two or more hydrogen atoms from C$_1$-C$_{20}$ alkane, C$_6$-C$_{20}$ aromatic hydrocarbon or C$_3$-C$_{20}$ hydrocarbon ring connected to each other.

In Unit-D, the double wavy line portion represents a site at which the structure is connected to other structures. The double wavy line portion may be connected to the double dotted line portion in Unit-B, etc. or structures other than Unit-A to E. The double wavy line portions are not connected to each other.

In the first exemplary embodiment, A$^2$ is preferably a group having three or more carbon atoms. Preferred examples of A$^2$ include C$_6$-C$_{18}$ straight-chain alkylene groups, phenylene groups, naphthylene groups, cyclohexylene groups, hydrocarbon rings containing crosslinking such as norbornene and adamanthane, groups having two alkylene groups connected to phenylene group (e.g., —CH$_2$—C$_6$H$_4$—CH$_2$—, —CH$_2$CH$_2$—C$_6$H$_4$—CH$_2$CH$_2$—), groups having two alkylene groups connected to naphthylene group, and groups having two alkylene groups connected to cyclohexylene group.

In the second exemplary embodiment, preferred examples of A$^2$ include C$_6$-C$_{18}$ straight-chain alkylene groups, phenylene groups, naphthylene groups, cyclohexylene groups, groups having two alkylene groups connected to phenylene group (e.g., —CH$_2$—C$_6$H$_4$—CH$_2$—, —CH$_2$CH$_2$—C$_6$H$_4$—CH$_2$CH$_2$—), groups having two alkylene groups connected to naphthylene group, and groups having two alkylene groups connected to cyclohexylene group.

Unit-B is preferably Unit-E as shown below.

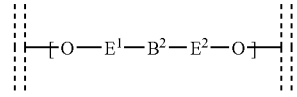

Unit-E

On the first exemplary embodiment, in Unit-E, B$^2$ represents a straight-chain alkylene group, hydrocarbon ring or group obtained by excluding two hydroxy groups from bisphenol compound and $E^1$ and $E^2$ each independently represent a single bond, alkylene oxide group or group having two or more alkylene oxide groups connected to each other.

On the second exemplary embodiment, in Unit-E, $B^2$ represents a straight-chain alkylene group or group obtained by excluding two hydroxy groups from bisphenol compound and $E^1$ and $E^2$ each independently represent a single bond, alkylene oxide group or group having two or more alkylene oxide groups connected to each other.

In Unit-E, the double dotted line portion represents a site at which the structure is connected to other structures. The double dotted line portion may be connected to the double wavy line portion in Unit-A, etc. or structures other than Unit-A to E. The double dotted line portions are not connected to each other.

In the first exemplary embodiment, preferred examples of the aforementioned bisphenol compound include bisphenol A, bisphenol E, bisphenol P, bisphenol M, bisphenol S, and bisphenol Z.

On the first exemplary embodiment, in the case where $B^2$ is a straight-chain alkylene group, $E^1$ and $E^2$ each are preferably a hydrocarbon. In the case where $B^2$ is a group obtained by excluding two hydroxyl groups from the bisphenol compound, $E^1$ and $E^2$ each are independently an alkylene oxide group or group having two or more alkylene oxide groups connected to each other. The hydrocarbon ring may be in any of the aforementioned forms. As the alkylene oxide group there is preferably used ethylene oxide group and/or propylene oxide group.

In the second exemplary embodiment, the aforementioned straight-chain alkylene group preferably has 5 or more carbon atoms. Preferred examples of the aforementioned bisphenol compound include bisphenol A, bisphenol C, bisphenol E, bisphenol S, and bisphenol Z. In the case where $B^2$ is a straight-chain alkylene group, $E^1$ and $E^2$ each are preferably a single bond. In the case where $B^2$ is a group obtained by excluding two hydroxyl groups from the bisphenol compound, $E^1$ and $E^2$ each are independently an alkylene oxide group or group having two or more alkylene oxide groups connected to each other. As the alkylene oxide group there is preferably used ethylene oxide group and/or propylene oxide group.

In the binder resin in the first exemplary embodiment of the invention, 80% or more of the repeating units in the resin is particularly preferably Unit-D or Unit-E.

The binder resin in the second exemplary embodiment of the invention is particularly preferably a polyester 90% or more of the repeating units of which is Unit-D or Unit-E.

In the binder resin in the first exemplary embodiment of the invention, 80% or more of the repeating units in the resin is particularly preferably Unit-DE.

The binder resin in the second exemplary embodiment of the invention is particularly preferably a polyester 90% or more of the repeating units of which is the following Unit-DE.

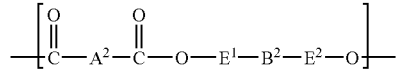

Unit-DE

On the first exemplary embodiment, in Unit-DE, $A^2$ represents a group obtained by excluding two or more hydrogen atoms from $C_1$-$C_{20}$ alkane, $C_6$-$C_{20}$ aromatic hydrocarbon or $C_3$-$C_{20}$ hydrocarbon ring or group having two or more of these groups connected to each other, $B^2$ represents a straight-chain alkylene group or group obtained by excluding two hydroxyl groups from bisphenol compound and $E^1$ and $E^2$ each independently represent a single bond, alkylene oxide group or group having two or more alkylene oxide groups connected to each other.

On the second exemplary embodiment, in Unit-DE, $A^2$ represents a group having 5 or more carbon atoms obtained by excluding two or more hydrogen atoms from $C_5$-$C_{20}$ alkane, $C_6$-$C_{20}$ aromatic hydrocarbon or $C_5$-$C_{20}$ hydrocarbon ring or a group having 5 or more carbon atoms having two or more groups obtained by excluding two or more hydrogen atoms from $C_1$-$C_{20}$ alkane, $C_6$-$C_{20}$ aromatic hydrocarbon or $C_3$-$C_{20}$ hydrocarbon ring connected to each other, $B^2$ represents a group obtained by excluding two hydroxyl groups from bisphenol compound and $E^1$ and $E^2$ each independently represent a single bond, alkylene oxide group or group having two or more alkylene oxide groups connected to each other.

$A^2$, $B^2$, $E^1$ and $E^2$ in Unit-DE in the first and second exemplary embodiments are as defined in Unit-D or Unit-E in the first and second exemplary embodiment, including their preferred ranges, respectively.

The glass transition temperature of the binder resin for toner prepared in the first and second exemplary embodiments of the invention is preferably from 30° C. to 80° C. from the standpoint of fixability and image-forming properties. When the glass transition temperature of the binder resin is 30° C. or more, the resulting toner exhibits a good-powder fluidity at ordinary temperature. The binder resin itself exhibits excellent cohesive force at high temperatures. Accordingly, the toner can difficultly cause offset during fixing to advantage. When the glass transition temperature of the binder resin is 80° C. or less, the resulting binder resin can be sufficiently melted, making it difficult for the lowest fixable temperature to rise to advantage. The glass transition temperature of the binder resin is more preferably from 35° C. to 75° C., most preferably from 45° C. to 65° C. The glass transition temperature of the binder resin can be controlled by the adjustment of the molecular weight of the binder resin or the monomers constituting the binder resin or the addition of a crosslinking agent.

The binder resin prepared in the first and second exemplary embodiments of the invention is preferably reacted at a temperature lower than the related-art reaction temperature. The reaction temperature is preferably from 70° C. to 150° C., more preferably from not lower than 70° C. to not higher than 140° C., even more preferably from not lower than 80° C. to lower than 140° C. When the reaction temperature is lower than the above defined range, the deterioration of reactivity and the inhibition of expansion of molecular weight attributed to the deterioration of solution of monomer and catalytic activity can occur. Further, when the reaction temperature is higher than the above defined range, it deviates from the original purpose of the invention, which is production with low energy. Further, the coloration of the resin or the decomposition of the resulting polyester attributed to high temperature can occur. The reaction time during polycondensation depends on the reaction temperature but is preferably from 0.5 to 72 hours, more preferably from 1 to 48 hours.

The polycondensation reaction at the polycondensation step in the first and second exemplary embodiments of the invention can be carried out by any ordinary polycondensation method such as underwater polymerization method, e.g., bulk polymerization, emulsion polymerization and suspension polymerization, solution polymerization and interface polymerization, preferably in the first exemplary embodiment underwater polymerization method. The polycondensation reaction can be effected at the atmospheric pressure. In the case where it is intended to raise the molecular weight of the polyester, the polycondensation reaction can be effected under ordinary conditions such as under reduced pressure and in a nitrogen stream.

<Aqueous Medium>

The polycondensation reaction at the polycondensation step in the first exemplary embodiment of the invention may be effected in an aqueous medium. In the second exemplary embodiment of the invention, the dispersion medium for particulate resin dispersion is preferably an aqueous medium.

Examples of the aqueous medium employable herein include water such as distilled water and deionized water, and alcohols such as ethanol and methanol. Preferred among these aqueous media are ethanol and water. Particularly preferred among these aqueous media are distilled water and deionized water. These aqueous media may be used singly or in combination of two or more thereof.

As the aqueous medium there may be also used a water-miscible organic solvent. Examples of the water-miscible organic solvent include acetone and acetic acid.

<Organic Solvent>

The polycondensation reaction at the polycondensation step in the first and second exemplary embodiments of the invention may be effected with an organic solvent.

Specific examples of the organic solvent employable herein include hydrocarbon-based solvents such as toluene, xylene and mesitylene, halogen-based solvents such as chlorobenzene, bromobenzene, iodobenzene, dichlorobenzene, 1,1,2,2-tetrachlorobenzene and p-chlorotoluene, ketone-based solvents such as 3-hexane, acetophenone and benzophenone, ether-based solvents such as dibutyl ether, anisole, phenethol, o-dimethoxybenzene, p-dimethoxybenzene, 3-methoxytoluene, dibenzyl ether, benzyl phenyl ether, methoxy naphthalene and tetrahydrofurane, thioether-based solvents such as phenyl sulfide and thioanisole, ester-based solvents such as ethyl acetate, butyl acetate, pentyl acetate, methyl benzoate, methyl phthalate, ethyl phthalate and cellosolve acetate, diphenyl ether-based solvents such as alkyl-substituted diphenylether (e.g., diphenyl ether, 4-methylphenyl ether, 3-methylphenyl ether, 3-phenoxyltoluene), halogen-substituted diphenyl ether (e.g., 4-bormophenyl ether, 4-chlorophenyl ether, 4-bromodiphenyl ether, 4-methyl-4'-bromodiphenyl ether), alkoxy-substituted diphenyl ether (e.g., 4-methoxydiphenyl ether, 4-methoxyphenyl ether, 3-methoxyphenyl ether, 4-methyl-4'-methoxydiphenyl ether) and cyclic diphenyl ether (e.g., dibenzofurane, xanthene). These organic solvents may be used in admixture. As the solvent to be used herein there is preferably used one which can be easily separated from water. In order to obtain a polyester having a high average molecular weight in particular, ester-based solvents, ether-based solvents and diphenyl ether-based solvents are more desirable. Alkyl-aryl ether-based solvents and ester-based solvents are particularly desirable.

Further, in the first and second exemplary embodiments of the invention, a dehydrator and a demonomerizer may be added to the organic solvent to obtain a binder resin having a high weight-average molecular weight. Specific examples of the dehydrator and demonomerizer include molecular sieves such as molecular sieve 3A, molecular sieve 4A, molecular sieve 5A and molecular sieve 13X, alumina, silica gel, calcium chloride, calcium sulfate, phosphorus pentoxide, concentrated sulfuric acid, magnesium perchlorate, barium oxide, calcium oxide, potassium hydroxide, sodium hydroxide, hydrogenated metals such as calcium hydride, sodium hydride and lithium aluminum hydride, and alkaline metals such as sodium. Preferred among these dehydrators and demonomerizers are molecular sieves from the standpoint of handleability and reproducibility.

In the first and second exemplary embodiments of the invention, commonly used polycondensation catalysts such as metal catalyst and hydrolysis enzyme may be used in combination with the polycondensation catalysts mentioned above.

As the metal catalysts there may be used the following compounds, but the invention is not limited thereto. Examples of the metal catalysts employable herein include organic tin compounds, organic titanium compounds, organic halogenated tin compounds, and rare earth metal catalysts.

As the organic tin compounds, organic titanium compounds and organic halogenated tin compounds there may be used known polycondensation catalysts.

As the rare earth-containing catalyst there may be effectively used one containing scandium (Sc), yttrium (Y) and lanthanoid element such as lanthan (La), cerium (Ce), praseodymium (Pr), neodium (Nd), samarium (Sm), europium (Eu), gadolinium (Gd), terbium (Tb), dysprosium (Dy), holmium (Ho), erbium (Er), thulium (Tm), ytterbium (Yb) and lutetium (Lu) In particular, alkylbenzene sulfonates, alkylsulfuric acid ester salts or rare earth-containing catalysts having a trifurate structure are useful.

As the rare earth-containing catalyst there is preferably used one having a trifurate structure such as scandium trifurate, yttrium trifurate and lanthanoid trifurate. For the details of lanthanoid trifurate, reference can be made to "Yuki Gosei kagaku Kyokaishi (Journal of Synthetic Organic Chemistry, Japan)", vol. 53, No. 5, pp. 44-54). The structural formula of the trifurate can be exemplified by $X(OSO_2CF_3)_3$ in which X represents a rare earth element, preferably scandium (Sc), yttrium (Y), ytterbium (Yb) or samarium (Sm).

In the case where as the catalyst there is used a metal catalyst, the content of metal derived from catalyst in the resin thus obtained is preferably 100 ppm or less, more preferably 75 ppm or less, even more preferably 50 ppm or less.

The hydrolysis catalyst employable herein is not specifically limited so far as it can catalyze ester synthesis reaction. Examples of the hydrolysis catalyst employable herein include esterase classified as EC (Enzyme Commission Number) 3.1 Group such as carboxy esterase, lipase, phospholipase, acetylesterase, pectin esterase, cholesterol esterase, tanase, monoacyl glycerol lipase, lactonase and lipoprotein lipase (see Maruo and Tamiya, "Koso Handobukku (Handbook of Enzymes)", Asakura Shoten, 1982), hydrolysis enzymes classified as EC 3.2 Group which act on glycosil compound such as glucosidase, gallactosidase, glucronidase and xylosidase, hydrolysis enzymes classified as EC 3.3 Group such as epoxy hydrase, hydrolysis enzymes classified as EC 3.4 Group which act on peptide bond such as aminopeptidase, chymotrypsin, plasmin and subtilisin, and hydrolysis enzymes classified as EC 3.7 Group such as phloretinhydrase.

Among these esterase, enzymes which hydrolyze glycerol ester to liberate aliphatic acid are called lipase. Lipase is advantageous in that it exhibits a high stability in an organic solvent to catalyze ester synthesis reaction in a good yield and can be inexpensively available. Accordingly, in the method for producing a polyester of the invention, too, lipase is preferably used from the standpoint of yield and cost.

As the lipase there may be used any of lipases having various origins. Preferred examples of these lipases include lipases obtained from microorganisms such as *Pseudomonas, Alcaligenes, Achromobacter, Candida, Aspergillus, Rhizopus* and *Mucor*, lipases obtained from plant seeds, lipases obtained from animal tissues, pancreatin, and steapsin. Preferred among these lipases are those derived from microorganisms such as Pseudomonas, Candida and Aspergillus.

Examples of the basic catalyst employable herein include ordinary organic basic compounds, nitrogen-containing basic compounds, and tetraalkyl phosphonium hydroxide or arylphosphonium hydroxide such as tetrabutyl phosphonium hydroxide. However, the invention is not limited to these compounds.

Examples of the organic basic compound employable herein include ammonium hydroxides such as tetramethyl ammonium hydroxide and tetraethyl ammonium hydroxide. Examples of the nitrogen-containing basic compound employable herein include amines such as triethylamine and dibenzylmethylamine, pyridine, methylpyridine, methoxypyridine, quinoline, and imidazole. Further, hydroxides, hydrides and amides of alkaline metals such as sodium, potassium, lithium and cesium and alkaline earth metals such as calcium, magnesium and barium, and salts of alkaline metals and alkaline earth metals with acids such as carbonic acid, phosphoric acid, boric acid, carboxylic acid and phenolic hydroxyl group may be used.

Further, compounds with alcoholic hydroxyl group or chelate compounds with acetyl acetone may be used, but the invention is not limited thereto.

Referring to the total added amount of catalysts, these catalysts may be added singly or in combination in a proportion of from 0.1 to 10,000 ppm based on the monomers.

The weight-average molecular weight of the binder resin produced in the first exemplary embodiment of the invention is preferably from 5,000 to 60,000, more preferably from 7,000 to 40,000, even more preferably from 10,000 to 35,000 so that the binder is adapted for toner. When the weight-average molecular weight of the binder resin is 5,000 or more, the binder resin exhibits an excellent powder fluidity at ordinary temperature. The resulting toner can difficultly cause blocking. When used as toner, the binder resin exhibits a sufficient cohesive force and hence an excellent resistance to hot offset to advantage. When the weight-average molecular weight of the binder resin is 50,000 or less, the resulting binder resin exhibits a good resistance to hot offset and a low lowest fixable temperature. The binder resin requires a short time and a low temperature for polycondensation, giving an excellent production efficiency to advantage.

In order that the binder resin produced by the production method of the second exemplary embodiment of the invention might be adapted to toner, the proper weight-average molecular weight of the binder resin is preferably from 5,000 to 50,000, more preferably from 7,000 to 35,000, even more preferably from 8,000 to 30,000. When the binder resin has a weight-average molecular weight of 5,000 or more, the resulting toner exhibits an excellent powder fluidity at ordinary temperature. The resulting toner can difficultly cause blocking. When used as toner, the binder resin exhibits a sufficient cohesive force and hence an excellent resistance to hot offset to advantage. When the weight-average molecular weight of the binder resin is 50,000 or less, the resulting binder resin exhibits a good resistance to hot offset and a low lowest fixable temperature. The binder resin requires a short time and a low temperature for polycondensation, giving an excellent production efficiency to advantage.

The number-average molecular weight of the binder resin produced by the production method of the second exemplary embodiment of the invention is preferably from 1,000 to 10,000, more preferably from 1,500 to 8,000, even more preferably from 1,800 to 7,000. When the number-average molecular weight of the binder resin falls within the above defined range, it is advantageous in the stability of the powder against heat.

The weight-average molecular weight of the binder resin can be measured by any known method such as gel permeation chromatography (GPC).

Further, the molecular weight distribution of the binder resin in the second exemplary embodiment of the invention is preferably from 1.0 to 4.0, more preferably from 1.0 to 3.5. When the molecular weight distribution of the binder resin of the invention falls within the above defined range, the resulting toner shows little dispersion of fixability or producibility to advantage.

The binder resin in the first and second exemplary embodiments of the invention can be polycondensed with monomers other than those described above so far as the properties thereof cannot be impaired. Examples of the other monomers include monovalent carboxylic acids, monovalent alcohols, and radical polymerizable monomers having unsaturated bond. These monofunctional monomers can cap the ends of polyester and thus allows effective terminal modification, making it possible to control the properties of polyester. These monofunctional monomers may be used in the initial stage of polymerization or added during polymerization.

In the first and second exemplary embodiments of the invention, the polycondensation step may involve polymerization reaction of the monomers described already with previously prepared prepolymers. The prepolymers to be used herein are not limited so far as they can be melted in or uniformly mixed with the aforementioned monomers.

Further, the binder resin of the invention may have a homopolymer of the aforementioned monomers, a copolymer comprising in combination two or more monomers, including the aforementioned monomers, a mixture or graft polymer thereof, partly branched or crosslinked structure, or the like.

The binder resin produced by the production method in the first and second exemplary embodiments of the invention can be subjected to a mechanical process such as grinding method or a so-called chemical process which comprises producing a particulate resin dispersion from the binder resin, and then producing a toner therefrom.

(Particulate Resin Dispersion and Method for Producing Same)

The particulate resin dispersion in the first and second exemplary embodiments of the invention has a particulate resin containing at least a binder resin dispersed in a dispersion medium. The aforementioned binder resin is produced by the method of the first and second exemplary embodiments of the invention for producing a binder resin.

In the first and second exemplary embodiments of the invention, the dispersion medium for particulate resin dispersion is preferably the aforementioned aqueous medium.

Further, the particulate resin dispersion of the first and second exemplary embodiments of the invention can be used as a particulate resin dispersion for electrostatic image development to advantage.

The median diameter (central diameter) of the particulate resin dispersion in the first and second exemplary embodiments of the invention is preferably from not smaller than 0.05 μm to not greater than 2.0 μm, more preferably from not smaller than 0.1 μm to not greater than 1.5 μm, even more preferably from not smaller than 0.1 μm to not greater than 1.0 μm. When the median diameter of the particulate resin dispersion falls within the above defined range, the state of dispersion of the particulate resin in the aqueous medium can be stabilized as mentioned above to advantage. When used to prepare a toner, the particulate resin dispersion having a median diameter falling within this range can be easily controlled in its particle diameter. The toner thus prepared exhibits excellent peelability during fixing and offset resistance to advantage.

The median diameter of the particulate resin can be measured, e.g., by a laser diffraction type particle size distribution measuring instrument (LA-920, produced by HORIBA, Ltd.).

The method for producing a particulate resin dispersion in the first and second exemplary embodiments of the invention is not specifically limited so far as the binder resin of the invention is used. The particulate resin dispersion of the invention can be produced by any known method.

As the method for producing a particulate resin dispersion in the first and second exemplary embodiments of the invention there may be used, e.g., method involving a dispersion step of dispersing the aforementioned binder resin-containing material in an aqueous medium to obtain a particulate resin dispersion.

At the aforementioned dispersion step, the dispersion of the particulate resin is preferably carried out with a surfactant added to enhance the dispersion efficiency or the stability of the particulate resin dispersion.

As the method for finely dispersing the binder resin in an aqueous medium there may be used a method involving suspension polymerization, solution suspension, miniemulsion, microemulsion or emulsion polymerization including multistage swelling and seed polymerization in an aqueous medium during the production of the binder resin as mentioned above.

Among these methods for producing a particulate resin dispersion, the method for producing a particulate resin dispersion in the first and second exemplary embodiments of the invention preferably involves a step of preparing an emulsion dispersion having an oil phase containing at least a polycondensable monomer emulsion-dispersed in an aqueous medium and a step of polycondensing the polycondensable monomer in the aqueous medium in the presence of the aforementioned polycondensation catalyst whereby a particulate resin dispersion having a binder resin produced by the production method in the first and second exemplary embodiments of the invention dispersed therein is produced. In accordance with the aforementioned production method, the particulate resin dispersion in the first and second exemplary embodiments of the invention can be produced by a simple procedure. Further, the aforementioned production method can fairly save energy to advantage.

In the method for producing a binder resin in the first and second exemplary embodiments of the invention and the method for producing a particulate resin dispersion of the invention, in the case where emulsion polycondensation is effected in an aqueous medium, the optimum emulsification temperature is preferably as low as possible, more preferably from 40° C. to 150° C., even more preferably from 80° C. to 130° C. in the first exemplary embodiment and even more preferably from 60° C. to 130° C. in the second exemplary embodiment from the standpoint of energy saving, production rate of polymer and thermal decomposition rate of polymer produced. When the emulsification temperature is 150° C. or less, the required energy is not excessive, making it possible to prevent the reduction of molecular weight due to the decomposition of the resin at high temperature to advantage. When the emulsification temperature is 40° C. or more, the resulting resin exhibits a proper viscosity and thus can be easily finely divided to advantage.

As the method for finely dispersing the binder resin in the first and second exemplary embodiments of the invention in the aqueous medium there can be selected from known methods such as forced emulsification, self-emulsification and phase inversion emulsification. Preferred among these emulsification methods are self-emulsification method and phase inversion emulsification method taking into account the energy required for emulsification, the particle diameter controllability and stability of emulsion obtained, etc.

For the details of self-emulsification method and phase inversion emulsification method, reference can be made to "Chobiryushi Porima no Oyo Gijutsu (Technique for Application of Ultrafine Polymers)", CMC Shuppan. Examples of the polar group to be used in self-emulsification include carboxyl groups and sulfone groups. In the case of application to the binder resin in the first and second exemplary embodiments of the invention (particularly amorphous polyester), carboxyl groups are preferably used.

In the case where an organic solvent is used at the aforementioned dispersion step, the method for producing a particulate resin dispersion in the first and second exemplary embodiments of the invention may involve at least a step of removing a part of the organic solvent and a step of forming a particulate resin.

For example, a binder resin-containing material which has been emulsified is then preferably solidified in the form of particulate material by removing a part of the organic solvent. Specific examples of the solidification method include a method which comprises blowing an inert gas such as air and nitrogen through an emulsion dispersion of a polycondensed resin-containing material in an aqueous medium with stirring to dry the organic solvent away on the gas-liquid interface (exhaust gas drying method), a method which comprises keeping the emulsion dispersion under reduced pressure optionally while being bubbled with an inert gas to dry the emulsion dispersion (vacuum topping method), and a method which comprises repeatedly spraying an emulsion dispersion of a polycondensed resin-containing material in an aqueous medium or an emulsion of a polycondensed resin-containing material through a nozzle onto a dish-shaped receptor to dry the material (shower process desolventing method). These methods are preferably selectively used or used in combination to effect desolvation depending on the evaporation rate and water solubility of the organic solvent used.

(Electrostatic Image Development Ground Toner)

The electrostatic image development ground toner (hereinafter occasionally referred to as "ground toner") of the invention is a ground toner containing at least a binder resin, wherein the binder resin is a binder resin for electrostatic image development toner produced by the method for producing a binder resin of the invention (specifically, in the second exemplary embodiment).

The electrostatic image development ground toner of the invention can be produced by any known method such as knead-grinding method.

In the case where the ground toner is produced by the knead-grinding method, it is preferred that the binder resin produced as mentioned above be mixed with other toner materials with stirring before melt-kneading using a Henschel mixer, super mixer or the like. During this procedure, the capacity and rotary speed of the agitator, the agitation time and other factors must be selected in combination.

Subsequently, the mixture of the binder resin and the other toner materials is melt-kneaded by any known method. The kneading process is preferably effected using a single-screw or multi-screw extruder to enhance dispersibility to advantage. During this procedure, it is necessary that the number of kneading screw zones in the kneader, the cylinder temperature, the kneading speed, etc. be all controlled within a properly predetermined range. Among these controlling factors during kneading, those giving a great effect on the kneading conditions are the rotary speed of the kneader, the number of kneading screw zones and the cylinder temperature. In general, the rotary speed of the kneader is preferably from 300 to 1,000 rpm. Referring to the number of kneading screw zones, a multi-stage zone such as two-stage zone is preferred to single-stage zone to attain better kneading. The cylinder temperature, if the binder resin is mainly composed of an amorphous polyester, is predetermined by the softening temperature of the amorphous polyester and is preferably from 20° C. lower than the softening temperature of the amorphous polyester to 100° C. higher than the softening temperature of the amorphous polyester. When the cylinder temperature falls within the above defined range, sufficient knead dispersion can be attained to cause little agglomeration. Further, kneading shear can be given to the material, making it easy to effect sufficient dispersion and cool the material thus kneaded to advantage.

The material thus melt-kneaded is thoroughly cooled, and then ground by any known method such as mechanical grinding method using a ball mill, sand mill, hammer mill or the like and air flow type grinding method. In the case where ordinary process cooling cannot be sufficiently attained, a cooling or freeze grinding method can be selected.

For the purpose of controlling the particle size distribution of the toner, the toner thus ground can be classified. By classifying the particles so that particles having improper particle diameters are excluded, the fixability of the toner and the image quality can be enhanced to advantage.

(Electrostatic Image Development Toner and Method for Producing Same)

On the other hand, with the recent growing demand for higher image quality, a chemical method for producing a toner has been often employed as a technique for approaching the reduction of particle diameter of toner and energy for toner production. As a chemical method for producing a toner using the polyester of the invention there may be employed a general-purpose production method. However, an agglomeration coalescence method is preferably used. The agglomeration coalescence method is a known agglomeration method which comprises agglomerating (coalescing) a latex having a binder resin dispersed in water with other toner materials.

The method for producing an electrostatic image development toner of the invention (hereinafter occasionally referred to as "toner") involves at least a step of agglomerating a particulate resin in a dispersion of the particulate resin to obtain agglomerated particles (hereinafter occasionally referred to as "agglomerating step") and a step of heating the agglomerated particles so that they are fused (hereinafter occasionally referred to as "fusing step") wherein the particulate resin dispersion is a particulate resin dispersion for electrostatic image development toner of the invention.

The term "electrostatic image development toner" and "toner" as used herein are each meant to indicate not only the toner produced by chemical production method but also the aforementioned ground toner.

The toner of the invention is made of a binder resin in the first exemplary embodiment of the invention and thus exhibits a high fluidity and can difficultly cause blocking. The toner of the invention also exhibits improved thermal storage properties to advantage.

The ground toner of the invention and the toner produced by the chemical production method each comprise a binder resin in the second exemplary embodiment of the invention and thus are excellent in hot offset properties and cold offset properties during fixing. Further, the toner produced by the chemical production method of the invention is excellent also in particle distribution to advantage.

The particulate resin dispersion thus prepared, i.e., so-called latex can be subjected to agglomeration (coalescence) to produce a toner having controlled particle diameter range and distribution. In some detail, the latex thus prepared is mixed with a particulate coloring agent dispersion and a particulate releasing agent dispersion. To the mixture is then added an agglomerating agent to cause heteroagglomeration leading to the formation of agglomerated particles having a diameter for toner. Thereafter, the agglomerated particles are heated to a temperature of not lower than the glass transition point or melting point of the particulate resin so that they are fused and coalesced. The agglomerated particles thus fused and coalesced are washed and dried to produce the electrostatic image development toner. In accordance with the production method, the heating temperature conditions can be properly selected to control the shape of the toner within the range of from amorphous to sphere.

In the agglomerating step in the first and second exemplary embodiments of the invention, a mixture of a particulate resin dispersion other than the particulate resin dispersion of the invention and a particulate resin dispersion of the invention may be subjected to agglomeration step and subsequent steps. In this case, a particulate resin dispersion of the invention is previously agglomerated to form a first agglomerated particulate resin to which a particulate resin dispersion of the invention or another particulate resin is added to form a second shell layer on the surface of the first particulate resin. In this manner, the particulate resin can be multilayered. It goes without saying that a multilayered particulate resin can be prepared in the order opposite that of the aforementioned example.

Alternatively, at the agglomerating step, a particulate resin dispersion containing a binder resin in each of the first and second exemplary embodiments of the invention and a particulate colorant dispersion are previously agglomerated to form a first particulate resin to which a particulate resin dispersion containing a binder resin in each of the first and second exemplary embodiments of the invention and another particulate resin dispersion are added to form a second shell layer on the surface of the first particulate resin. While a colorant dispersion is separately prepared in this example, it goes without saying that the particulate resin may comprise a colorant incorporated therein.

The agglomerated particles which have been fused and coalesced are then subjected to arbitrary washing step, solid-liquid separation step and drying step to obtain a desired particulate toner. Taking into account chargeability, the washing step preferably involves sufficient replacement washing with deionized water. The solid-liquid separation step is not specifically limited. However, the solid-liquid separation step is preferably carried out by vacuum filtration, filtration under pressure or the like from the standpoint of productivity. Further, the drying step is not specifically limited. However, freeze drying, flash jet drying, flow drying, oscillation type flow drying or the like is preferably effected from the standpoint of productivity.

As the agglomerating agent there is preferably-used an inorganic salt or divalent or higher metal salt besides surfactant. In particular, metal salts are preferably used from the standpoint of control of agglomeration and properties such as toner chargeability. The metal salt compound to be used in agglomeration is obtained by dissolving an ordinary inorganic metal compound or polymer thereof in a particulate resin dispersion. The metal element constituting the inorganic metal salt is a metal element having a divalent or higher charge belonging to the group 2A, 3A, 4A, 5A, 6A, 7A, 8, 1B, 2B and 3B of the periodic table (long period) so far as it can be dissolved in ionic form in the agglomerated system of particulate resin. Specific preferred examples of the inorganic metal salt include metal salts such as calcium chloride, calcium nitrate, barium chloride, magnesium chloride, zinc chloride, aluminum chloride and aluminum sulfate, and inorganic metal salt polymers such as polyaluminum chloride, polyaluminum hydroxide and calcium polysulfate. Particularly preferred among these inorganic metal salts are aluminum salts and polymers thereof. In general, in order to obtain a sharper particle size distribution, the valence of the inorganic metal salt is preferably as high possible. For example, divalent inorganic metal salts are preferred to monovalent inorganic metal salts. Further, trivalent inorganic metal salts are preferred to divalent inorganic metal salts. Even when the valence of the inorganic metal salts are the same, polymer type inorganic metal salt polymers are preferred.

In the first and second exemplary embodiments of the invention, known additives are incorporated in the binder resin singly or in combination as necessary so far as the results of the invention cannot be affected. Examples of these additives include fire retardants, fire retarding aids, gloss agents, waterproofing agents, water repellents, inorganic fillers (surface modifiers), releasing agents, oxidation inhibitors, plasticizers, surfactants, dispersing agents, lubricants, fillers, extender pigments, binders, and charge controllers. These additives may be incorporated at any step during the production of the coating agent.

Referring to examples of the fillers, as the charge controller there may be used any of commonly used various charge controllers such as quaternary ammonium salt compound and nigrosine-based compound. Materials which can be difficultly dissolved in water are preferred from the standpoint of stability during production and prevention of contamination with waste water.

Examples of the releasing agent include low molecular polyolefines such as polyethylene, polypropylene and polybutene, silicones having a heating softening point, aliphatic acid amides such as oleic acid amide, erucic acid amide, ricinolic acid amide and stearic acid amide, vegetable-based waxes such as carnauba wax, rice wax, candelilla wax, Japan wax and johoba oil, animal-based waxes such as beeswax, mineral and petroleum-based waxes such as montan wax, ozokelite, ceresine, paraffin wax, microcrystalline wax and Fischer-Tropsch wax, and modification products thereof.

These waxes are dispersed in water with an ionic surfactant and a polymer electrolyte such as polymer acid and polymer base. The dispersion is then finely divided while being heated to a temperature of not lower than the melting point thereof using a homogenizer or pressure ejection type dispersing machine capable of giving a high shearing force to prepare a dispersion of particles having a diameter of 1 μm or less.

As the fire retardant and fire retarding aid there are exemplified bromine-based fire retardants which have been already used commonly, antimony trioxide, magnesium hydroxide, aluminum hydroxide and polyammonium phosphate. However, the invention is not limited to these compounds.

Examples of the coloring component include carbon black such as furnace black, channel black, acetylene black and thermal black, inorganic pigments such as red iron oxide, Prussian blue and titanium oxide, azo pigments such as fast yellow, diazo yellow, pyrazolone red, chelate red, brilliant carmine and parabrown, phthalocyanine pigments such as copper phthalocyanine and metal-free phthalocyanine, and condensed polycyclic pigments such as flavanthrone yellow, dibromoanthrone orange, perylene red, quinacridone red and dioxazine violet. Further examples of the coloring component include chrome yellow, hanza yellow, benzidine yellow, threne yellow, quinoline yellow, permanent orange GTR, pyrazolone orange, vulcan orange, Watchung red, permanent red, Du pont oil red, lithol red, rhodamine B lake, lake red C, rose bengal, aniline blue, ultramarine blue, chalcoil blue, methylene blue chloride, phthalocyanine blue, phthalocyanine green, malachite green oxalate, C.I. pigment red 48:1, pigment red 122, C.I. pigment red 57:1, C.I. pigment yellow 12, C.I. pigment yellow 97, C.I. pigment yellow 17, C.I. pigment blue 15:1, and C.I. pigment blue 15:3. These coloring components may be used singly or in combination of two or more thereof.

As in ordinary toners, an inorganic particulate material such as silica, alumina, titania and calcium carbonate or a particulate resin such as vinyl-based resin, polyester and silicone which has been dried can be sheared dried, and then added to the surface of the binder resin material as a flowing aid or cleaning aid.

Examples of the surfactants which can be effectively used in combination include anionic surfactants such as sulfuric acid ester salt-based surfactant, sulfonic acid salt-based surfactant, phosphoric acid ester-based surfactant and soap-based surfactant, cationic surfactants such as amine salt-based surfactant and quaternary ammonium salt-based surfactant, and nonionic surfactants such as polyethyleneglycol-based surfactant, alkylphenol ethylene oxide-based surfactant and polyvalent alcohol-based surfactant. As the means for dispersion there may be used any ordinary means such as rotary shearing homogenizer and ball mill, sand mill and dinomill having media.

The volume-average particle diameter ($D_{50}$) of the toner in the first and second exemplary embodiments of the invention is preferably from 3.0 μm to 20.0 μm, more preferably from 3.0 μm to 9.0 μm. When $D_{50}$ is 3.0 μm or more, the resulting toner exhibits a proper adhesion and hence an excellent developability to advantage. When $D_{50}$ is 20.0 μm or less, the resulting toner is excellent in image resolution. The volume-average particle diameter ($D_{50}$) of the toner of the invention can be measured using a laser diffraction type particle size distribution measuring instrument.

The volume-average particle diameter distribution GSDv of the toner in the first and second exemplary embodiments of the invention is preferably 1.4 or less. In particular, the toner produced by chemical method more preferably has GSDv of 1.3 or less. The particle diameter distribution can be simply represented by the following volume-average particle diameter distribution GSD or number GSD using cumulative distribution $D_{16}$ and $D_{84}$ $$\text{Volume } GSDv = (\text{Volume } D_{84}/\text{volume } D_{16})^{0.5}$$

When GSDv is 1.4 or less, the resulting toner has a uniform particle diameter and an excellent fixability and can difficultly cause device failure due to malfixing and contamination of the interior of the machine or deterioration of developer with scattered toner to advantage. The volume-average particle diameter distribution GSD can be measured using a laser diffraction type particle size distribution measuring instrument.

Similarly, the shape factor SF1 of the toner in the first and second exemplary embodiments of the invention is preferably from 100 to 140, more preferably from 110 to 135 from the standpoint of image forming properties. SF1 is calculated as follows.

$$SF1 = \frac{(ML)^2}{A} \times \frac{\pi}{4} \times 100$$

wherein ML represents the absolute maximum length of particle; and A represents the projected area of particle In some detail, a microscope image or scanning electron microscope image is taken in and analyzed by a luzex image analyzer to obtain numerical values.

(Electrostatic Image Developer)

The electrostatic image development toner in the first and second exemplary embodiments of the invention can be used as an electrostatic image developer. This developer is not specifically limited except that it contains this electrostatic image development toner. This developer can have a proper formulation depending on the purpose. When the electrostatic image toner is singly used, a one-component electrostatic image developer is prepared. When the electrostatic image toner is used in combination with a carrier, a two-component electrostatic image developer is prepared.

A method may be used which comprises subjecting one-component developer to triboelectric charging with a development sleeve or charging member to form a charged toner with which development is made according to electrostatic latent image.

The carrier to be used herein is not specifically limited. Examples of the carrier which is normally used herein include particulate magnetic materials such as iron powder, ferrite powder, iron oxide powder and nickel powder, resin-coated carriers obtained by coating a particulate magnetic material as a core material with a resin such as styrene-based resin, vinyl-based resin, ethylene-based resin, rosin-based resin, polyester-based resin and melamine-based resin or wax such as stearic acid to form a resin coat layer thereon, and magnetic material-dispersed carriers having a particulate magnetic material dispersed in a binder resin. Particularly preferred among these carriers are resin-coated carriers because the chargeability of the toner or the resistivity of the entire carrier can be controlled by the configuration of the resin coat layer.

Referring to the mixing proportion of the toner of the invention and the carrier in the two-component electrostatic image developer, the mixing proportion of the toner is normally from 2 to 10 parts by weight based on 100 parts by weight of the carrier. The method for producing the developer is not specifically limited but may involve mixing using a V blender.

(Image Forming Method)

The electrostatic image development toner and the electrostatic image developer in the first and second exemplary embodiments of the invention can be used for the image forming method in ordinary electrostatic image development process (electrophotography).

The image forming method of the invention comprises a latent image forming step of forming an electrostatic latent image on the surface of a latent image retainer, a development step of developing the electrostatic latent image formed on the surface of the latent image retainer with a developer containing a toner to form a toner image, a step of transferring the toner image formed on the surface latent image retainer onto the surface of a transferring material and a fixing step of heat-fixing the toner image transferred on the surface of the transferring material, wherein as the toner there is used an electrostatic image ground development toner in the first and second exemplary embodiments of the invention or an electrostatic image development toner in the first and second exemplary embodiments of the invention or as the developer there is used an electrostatic image developer in the first and second exemplary embodiments of the invention.

For the details of these steps, if attained by steps known in image forming method, reference can be made to JP-A-56-40868, JP-A-49-91231, etc.

The image forming method of the invention may involve steps other than the aforementioned steps such as cleaning step of removing the electrostatic image developer left on the electrostatic image carrier. A further preferred exemplary embodiment of the image forming step of the invention involves a recycling step. This recycling step is adapted to move the electrostatic image development toner recovered at the cleaning sep to the developer layer. This image forming method involving a recycling step can be effected using an image forming device such as toner recycle system type copying machine and facsimile. The image forming method of the invention can be applied also to a recycle system free of cleaning step which recovers the toner at the same time with development.

As the latent image retainer there may be used, e.g., electrophotoreceptor, dielectric recording material or the like.

Referring to the operation of the electrophotoreceptor, the surface of the electrophotoreceptor is uniformly charged by a corotoron charger, triboelectric charger or the like, and then imagewise exposed to light to form an electrostatic latent image thereon (latent image forming step). Subsequently, the electrophotoreceptor is brought into contact with or moved in close to a development roller having a developer layer formed thereon so that toner particles are attached to the electrostatic latent image to form a toner image on the electrophotoreceptor (development step). The toner image thus formed is then transferred onto the surface of a transferring material such as paper using a corotoron charger or the like (transferring step). Subsequently, the toner image which has thus been transferred onto the surface of the transferring material is heat-fixed using a fixing machine (fixing step) to form a final toner image.

During the heat fixing using a fixing machine, a releasing agent is normally supplied into the fixing member in the fixing machine to prevent offset and other troubles.

EXAMPLE

The invention will be further described in the following examples, but the invention is not limited thereto.

1) Examples of Bulk Polymerization

Example A-1-1 of Amorphous Particulate Resin Dispersion 1,4-Cyclohexanedicarboxylic acid: 17.5 parts by weight
Bisphenol A-ethylene oxide 2 mol adduct: 31.0 parts by weight
n-Dodecylbenzenesulfonic acid: 0.6 parts by weight (1 mol-% based on total of monomers)
Branched dodecylbenzenesulfonic acid (Tayca Power B120, produced by Tayca Corporation): 0.6 parts by weight (1 mol-% based on total of monomers)

The aforementioned materials are mixed, and then charged in a 200 ml reactor equipped with an agitator where they are then subjected to polycondensation with monomers to obtain a uniformly transparent amorphous polyester resin.

Weight-average molecular weight by GPC: 12,000

Glass transition temperature (onset): 55° C.

The resin thus obtained is charged in a three-necked flask equipped with agitator and cooling pipe where it is then stirred with a 1 N aqueous solution of NaOH gradually added thereto while being kept at 95° C. When the added amount of aqueous solution of NaOH reached 50 parts by weight in total, the resin became slurried. The slurry thus obtained is charged in a flask having 180 parts by weight of a deionized water which had been adjusted to 85° C. The mixture is emulsified for 10 minutes using a homogenizer (Ultra Turrax, produced by IKA Corporation), and then emulsified 10 passes using an ultrahigh pressure homogenizer (Nanomizer, produced by YOSHIDA KIKAI CO., LTD.). The dispersion thus obtained is then cooled with ice to obtain a particulate resin dispersion. The particulate resin had a median diameter of 380 nm.

Example A-1-2 of Amorphous Particulate Resin Dispersion 1,4-Cyclohexanedicarboxylic acid: 17.5 parts by weight
Bisphenol A-ethylene oxide 2 mol adduct: 31.0 parts by weight
n-Dodecylbenzenesulfonic acid: 0.06 parts by weight (0.1 mol-% based on total of monomers)
Branched dodecylbenzenesulfonic acid (Tayca Power B120, produced by Tayca Corporation): 0.06 parts by weight (0.1 mol-% based on total of monomers)
The aforementioned materials are mixed, and then charged in a 200 ml reactor equipped with an agitator where they are then subjected to polycondensation at 120° C. for 24 hours to obtain a uniformly transparent amorphous polyester resin.
Weight-average molecular weight by GPC: 14,500
Glass transition temperature (onset): 55.5° C.
A particulate resin dispersion having a median diameter of 420 nm is then prepared in the same manner as in Example A-1-1.

Example A-1-3 of Amorphous Particulate Resin Dispersion 1,4-Cyclohexanedicarboxylic acid: 17.5 parts by weight
Bisphenol A-ethylene oxide 2 mol adduct: 31.0 parts by weight
n-Dodecylbenzenesulfonic acid: 0.2 parts by weight (0.35 mol-% based on total of monomers)
Branched dodecylbenzenesulfonic acid (Tayca Power B120, produced by Tayca Corporation): 0.2 parts by weight (0.35 mol-% based on total of monomers)
The aforementioned materials are mixed, and then charged in a 200 ml reactor equipped with an agitator where they are then subjected to polycondensation at 120° C. for 24 hours to obtain a uniformly transparent amorphous polyester resin.
Weight-average molecular weight by GPC: 14,000
Glass transition temperature (onset): 55.5° C.
A particulate resin dispersion having a median diameter of 410 nm is then prepared in the same manner as in Example A-1-1.

Example A-2-1 of Crystalline Particulate Resin Dispersion 1,9-Nonanediol: 16.0 parts by weight
Dodecane dioic acid: 23.0 parts by weight
n-Pentadecylbenzenesulfonic acid: 1.1 parts by weight (1.5 mol-% based on total of monomers)
Branched dodecylbenzenesulfonic acid (Tayca Power B150, produced by Tayca Corporation): 0.4 parts by weight (0.5 mol-% based on total of monomers)
The aforementioned materials are mixed, and then charged in a 200 ml reactor equipped with an agitator where they are then subjected to polycondensation at 120° C. for 24 hours to obtain a uniformly transparent amorphous polyester resin.
Weight-average molecular weight by GPC: 17,000
Melting point: 67.0° C.
A particulate resin dispersion having a median diameter of 320 nm is then prepared in the same manner as in Example

Example A-2-2 of Crystalline Particulate Resin Dispersion 1,9-Nonanediol: 16.0 parts by weight
Dodecane dioic acid: 23.0 parts by weight
n-Pentadecylbenzenesulfonic acid: 0.11 parts by weight (0.15 mol-% based on total of monomers)
Branched dodecylbenzenesulfonic acid (Tayca Power B150, produced by Tayca Corporation): 0.04 parts by weight (0.05 mol-% based on total of monomers)
The aforementioned materials are mixed, and then charged in a 200 ml reactor equipped with an agitator where they are then subjected to polycondensation at 120° C. for 24 hours to obtain a uniformly transparent amorphous polyester resin.
Weight-average molecular weight by GPC: 18,500
Melting point: 68.5° C.
A particulate resin dispersion having a median diameter of 360 nm is then prepared in the same manner as in Example A-1-1.

Example A-2-3 of Crystalline Particulate Resin Dispersion 1,9-Nonanediol: 16.0 parts by weight
Dodecane dioic acid: 23.0 parts by weight
n-Pentadecylbenzenesulfonic acid: 0.4 parts by weight (0.53 mol-% based on total of monomers)
Branched dodecylbenzenesulfonic acid (Tayca Power B150, produced by Tayca Corporation): 0.1 parts by weight (0.17 mol-% based on total of monomers)
The aforementioned materials are mixed, and then charged in a 200 ml reactor equipped with an agitator where they are then subjected to polycondensation at 120° C. for 24 hours to obtain a uniformly transparent amorphous polyester resin.
Weight-average molecular weight by GPC: 18,500
Melting point: 68.0° C.
A particulate resin dispersion having a median diameter of 340 nm is then prepared in the same manner as in Example A-1-1.

Example A-3-1 of Crystalline Particulate Resin Dispersion 1,4-Cyclohexanedicarboxylic acid: 17.5 parts by weight
Bisphenol A-ethylene oxide 2 mol adduct: 16.0 parts by weight
Bisphenol S-ethylene oxide 2 mol adduct: 17.0 parts by weight
n-Dodecanesulfonic acid: 0.5 parts by weight (1.0 mol-% based on total of monomers)
Branched dodecylbenzenesulfonic acid (Tayca Power B120, produced by Tayca Corporation): 0.6 parts by weight (1.0 mol-% based on total of monomers)
The aforementioned materials are mixed, and then charged in a 200 ml reactor equipped with an agitator where they are then subjected to polycondensation at 120° C. for 24 hours to obtain a uniformly transparent amorphous polyester resin.
Weight-average molecular weight by GPC: 8,600
Glass transition temperature (onset): 62.0° C.
A particulate resin dispersion having a median diameter of 390 nm is then prepared in the same manner as in Example A-1-1.

Example A-3-2 of Crystalline Particulate Resin Dispersion 1,4-Cyclohexanedicarboxylic acid: 17.5 parts by weight
Bisphenol A-ethylene oxide 2 mol adduct: 16.0 parts by weight
Bisphenol S-ethylene oxide 2 mol adduct: 17.0 parts by weight
n-Dodecanesulfonic acid: 0.95 parts by weight (0.18 mol-% based on total of monomers)
Dodecylbenzenesulfonic acid: 0.06 parts by weight (0.02 mol-% based on total of monomers)
The aforementioned materials are mixed, and then charged in a 200 ml reactor equipped with an agitator where they are then subjected to polycondensation at 120° C. for 24 hours to obtain a uniformly transparent amorphous polyester resin.
Weight-average molecular weight by GPC: 11,500
Glass transition temperature (onset): 63.0° C.
A particulate resin dispersion having a median diameter of 450 nm is then prepared in the same manner as in Example A-1-1.

2) Comparative Examples of Bulk Polymerization

Comparative Example A-1-1 of Amorphous Particulate Resin Dispersion 1,4-Cyclohexanedicarboxylic acid: 17.5 parts by weight
Bisphenol A-ethylene oxide 2 mol adduct: 31.0 parts by weight
n-Dodecylbenzenesulfonic acid: 1.2 parts by weight (2 mol-% based on total of monomers)
The aforementioned materials are mixed, and then charged in a 200 ml reactor equipped with an agitator where they are then subjected to polycondensation at 120° C. for 24 hours to obtain a uniformly transparent amorphous polyester resin.
Weight-average molecular weight by GPC: 9,200
Glass transition temperature (onset): 51° C.
A particulate resin dispersion having a median diameter of 400 nm is then prepared in the same manner as in Example A-1-1.

Comparative Example A-1-2 of Amorphous Particulate Resin Dispersion 1,4-Cyclohexanedicarboxylic acid: 17.5 parts by weight
Bisphenol A-ethylene oxide 2 mol adduct: 31.0 parts by weight
n-Dodecylbenzenesulfonic acid: 0.12 parts by weight (0.2 mol-% based on total of monomers)
The aforementioned materials are mixed, and then charged in a 200 ml reactor equipped with an agitator where they are then subjected to polycondensation at 120° C. for 24 hours to obtain a uniformly transparent amorphous polyester resin.
Weight-average molecular weight by GPC: 15,000
Glass transition temperature (onset): 55.5° C.
A particulate resin dispersion having a median diameter of 450 nm is then prepared in the same manner as in Example A-1-1.

Comparative Example A-1-3 of Amorphous Particulate Resin Dispersion 1,4-Cyclohexanedicarboxylic acid: 17.5 parts by weight
Bisphenol A-ethylene oxide 2 mol adduct: 31.0 parts by weight
n-Dodecylbenzenesulfonic acid: 0.45 parts by weight (0.7 mol-% based on total of monomers)
The aforementioned materials are mixed, and then charged in a 200 ml reactor equipped with an agitator where they are then subjected to polycondensation at 120° C. for 24 hours to obtain a uniformly transparent amorphous polyester resin.
Weight-average molecular weight by GPC: 11,500
Glass transition temperature (onset): 53.5° C.
A particulate resin dispersion having a median diameter of 420 nm is then prepared in the same manner as in Example A-1-1.

Comparative Example A-2 of Amorphous Particulate Resin Dispersion 1,4-Cyclohexanedicarboxylic acid: 17.5 parts by weight
Bisphenol A-ethylene oxide 1 mol adduct: 31.0 parts by weight
Branched dodecylbenzenesulfonic acid (Tayca Power B120, produced by Tayca by weight Corporation): 0.12 parts (0.2 mol-% based on total of monomers)
The aforementioned materials are mixed, and then charged in a 200 ml reactor equipped with an agitator where they are then subjected to polycondensation at 120° C. for 24 hours to obtain a uniformly transparent amorphous polyester resin.
Weight-average molecular weight by GPC: 8,800
Glass transition temperature (onset): 50° C.
A particulate resin dispersion having a median diameter of 410 nm is then prepared in the same manner as in Example A-1-1.

Comparative Example A-3-1 of Crystalline Particulate Resin Dispersion 1,9-Nonanediol: 16.0 parts by weight
Dodecane dioic acid: 23.0 parts by weight
n-Pentadecylbenzenesulfonic acid 1.5 parts by weight (2.0 mol-% based on total of monomers)
Branched dodecylbenzenesulfonic acid (Tayca Power B150, produced by Tayca Corporation): 0.015 parts by weight (0.02 mol-% based-on total of monomers)
The aforementioned materials are mixed, and then charged in a 200 ml reactor equipped with an agitator where they are then subjected to polycondensation at 120° C. for 24 hours to obtain a uniformly transparent amorphous polyester resin.
Weight-average molecular weight by GPC: 11,500
Melting point: 64.0° C.
A particulate resin dispersion having a median diameter of 340 nm is then prepared in the same manner as in Example A-1-1.

Comparative Example A-3-2 of Crystalline Particulate Resin Dispersion 1,9-Nonanediol: 16.0 parts by weight
Dodecane dioic acid: 23.0 parts by weight
n-Pentadecylbenzenesulfonic acid: 0.5 parts by weight (0.7 mol-% based on total of monomers)
Branched dodecylbenzenesulfonic acid (Tayca Power B150, produced by Tayca Corporation): 0.01 parts by weight (0.013 mol-% based on total of monomers)

The aforementioned materials are mixed, and then charged in a 200 ml reactor equipped with an agitator where they are then subjected to polycondensation at 120° C. for 24 hours to obtain a uniformly transparent amorphous polyester resin.
Weight-average molecular weight by GPC: 16,500
Melting point: 67.0° C.
A particulate resin dispersion having a median diameter of 390 nm is then prepared in the same manner as in Example A-1-1.

Comparative Example A-4-1 of Crystalline Particulate Resin Dispersion 1,9-Nonanediol: 16.0 parts by weight
Dodecane dioic acid: 23.0 parts by weight
n-Pentadecylbenzenesulfonic acid: 0.015 parts by weight (0.02 mol-% based on total of monomers)
Branched dodecylbenzenesulfonic acid (Tayca Power B150, produced by Tayca Corporation): 1.5 parts by weight (2.0 mol-% based on total of monomers)
The aforementioned materials are mixed, and then charged in a 200 ml reactor equipped with an agitator where they are then subjected to polycondensation at 120° C. for 24 hours to obtain a uniformly transparent amorphous polyester resin.
Weight-average molecular weight by GPC: 7,500
Melting point: 63.0° C.
A particulate resin dispersion having a median diameter of 470 nm is then prepared in the same manner as in Example A-1-1.

Comparative Example A-4-2 of Crystalline Particulate Resin Dispersion 1,9-Nonanediol: 16.0 parts by weight
Dodecane dioic acid: 23.0 parts by weight
n-Pentadecylbenzenesulfonic acid: 0.01 parts by weight (0.013 mol-% based on total of monomers)
Branched dodecylbenzenesulfonic acid (Tayca Power B150, produced by Tayca Corporation): 0.5 parts by weight (0.7 mol-% based on total of monomers)
The aforementioned materials are mixed, and then charged in a 200 ml reactor equipped with an agitator where they are then subjected to polycondensation at 120° C. for 24 hours to obtain a uniformly transparent amorphous polyester resin.
Weight-average molecular weight by GPC: 8,000
Melting point: 63.5° C.
A particulate resin dispersion having a median diameter of 490 nm is then prepared in the same manner as in Example A-1-1.

Comparative Example A-5-1 of Crystalline Particulate Resin Dispersion 1,4-Cyclohexanedicarboxylic acid: 17.5 parts by weight
Bisphenol A-ethylene oxide 2 mol adduct: 16.0 part by weight
Bisphenol S-ethylene oxide 2 mol adduct: 17.0 parts by weight
n-Dodecanesulfonic acid: 1.0 parts by weight (2.0 mol-% based on total of monomers)
The aforementioned materials are mixed, and then charged in a 200 ml reactor equipped with an agitator where they are then subjected to polycondensation at 120° C. for 24 hours to obtain a uniformly transparent amorphous polyester resin.
Weight-average molecular weight by GPC: 6,500
Glass transition temperature (onset): 60.0° C.
A particulate resin dispersion having a median diameter of 370 nm is then prepared in the same manner as in Example A-1-1.

Comparative Example A-5-2 of Crystalline Particulate Resin Dispersion 1,4-Cyclohexanedicarboxylic acid: 17.5 parts by weight
Bisphenol A-ethylene oxide 2 mol adduct: 16.0 parts by weight
Bisphenol S-ethylene oxide 2 mol adduct: 17.0 parts by weight
n-Dodecanesulfonic acid: 0.1 parts by weight (0.2 mol-% based on total of monomers)
The aforementioned materials are mixed, and then charged in a 200 ml reactor equipped with an agitator where they are then subjected to polycondensation at 120° C. for 24 hours to obtain a uniformly transparent amorphous polyester resin.
Weight-average molecular weight by GPC: 8,500
Glass transition temperature (onset): 62.0° C.
A particulate resin dispersion having a median diameter of 400 nm is then prepared in the same manner as in Example A-1-1.

As can be seen in the aforementioned results, in the case where a straight-chain catalyst and a branched catalyst are used in combination in an amount falling within the range defined herein, the resulting polycondensation product shows little change with the change of the amount of the catalysts. On the contrary, in the case where the combination of the invention is not used, the resulting polycondensation product shows a great change with the change of the amount of the catalysts.

3) Example A-4 of Underwater Polycondensation

<Preparation of Oil Phase 1>
1,6-Hexanediol: 5.9 parts by weight
Sebacic acid: 10.0 parts by weight
Styrene: 35.0 parts by weight
Dodecane thiol: 1.0 parts by weight
The aforementioned components are heated to 130° C. so that they are dissolved to prepare a uniform oil phase 1.
<Preparation of Aqueous Phase 1>
n-Pentadecylbenzenesulfonic acid: 1.2 parts by weight (3.3 mol-% based on total of monomers)
Branched dodecylbenzenesulfonic acid (Tayca Power B150, produced by Tayca Corporation): 2.4 parts by weight (6.6 mol-% based on total of monomers)
Cetyl alcohol: 1.5 parts by weight
Water: 200 parts by weight
<Preparation of Particulate Resin Dispersion 1>
The aforementioned aqueous solution thus prepared is stirred in a 70° C. constant temperature tank for 1 hour. The aforementioned aqueous phase 1 is put in a 1 l vessel in which the oil phase is then added. The mixture is then stirred at 8,000 rpm using Ultra Turrax (produced by IKA Corporation) for 3 minutes. The emulsion thus prepared is charged in a 500 ml reactor equipped with agitator where it is then subjected to polycondensation at 70° C. in a nitrogen atmosphere for 24 hours.
To the particulate resin dispersion thus prepared is added a solution of 1.1 parts by weight of ammonium persulfate in 10 parts by weight of deionized water. The mixture is then subjected to polymerization in a nitrogen atmosphere for 6 hours. As a result, a stable particulate resin dispersion is obtained. Similarly, a small portion of the particulate resin dispersion is sampled for the measurement of physical properties of polyester/styrene composite polymer.
Weight-average molecular weight of styrene by GPC: 41,000
Weight-average molecular weight of polyester by GPC: 6,800
Melting point of polyester: 58° C.
Median diameter: 350 nm The polymer thus obtained is then confirmed to be a particulate composite of styrene and polyester.

4) Comparative Example A-6

<Preparation of Oil Phase 2>
 1,6-Hexanediol: 5.9 parts by weight
 Sebacic acid: 10.0 parts by weight
 Styrene: 35.0 parts by weight
 Dodecane thiol: 1.0 parts by weight
 The aforementioned components are heated to 130° C. so that they are dissolved to prepare a uniform oil phase 2.
<Preparation of Aqueous Phase 2>
 Branched dodecylbenzenesulfonic acid (Tayca Power B150, produced by Tayca Corporation): 3.6 parts by weight (9.9 mol-% based on total of monomers)
 Cetyl alcohol: 1.5 parts by weight
 Water: 200 parts by weight
<Preparation of Particulate Resin Dispersion 2>
 The aforementioned aqueous solution thus prepared is stirred in a 70° C. constant temperature tank for 1 hour. The aforementioned aqueous phase 2 is put in a 1 l vessel in which the oil phase is then added. The mixture is then stirred at 8,000 rpm using Ultra Turrax (produced by IKA Corporation) for 3 minutes. The emulsion thus prepared is charged in a 500 ml reactor equipped with agitator where it is then subjected to polycondensation at 70° C. in a nitrogen atmosphere for 24 hours.

To the particulate resin dispersion thus prepared is added a solution of 1.1 parts by weight of ammonium persulfate in 10 parts by weight of deionized water. The mixture is then subjected to polymerization in a nitrogen atmosphere for 6 hours. As a result, a stable particulate resin dispersion is obtained. Similarly, a small portion of the particulate resin dispersion is sampled for the measurement of physical properties of polyester/styrene composite polymer.
Weight-average molecular weight of styrene by GPC: 43,500
Weight-average molecular weight of polyester by GPC: 3,100
Melting point of polyester: 57° C.
Median diameter: 350 nm The polymer thus obtained is then confirmed to be a particulate composite of styrene and polyester.

4) Comparative Example A-7

<Preparation of Oil Phase>
1,6-Hexanediol: 5.9 parts by weight
Sebacic acid: 10.0 parts by weight
Styrene: 35.0 parts by weight
Dodecane thiol: 1.0 parts by weight
 The aforementioned components are heated to 130° C. so that they are dissolved to prepare a uniform oil phase 2.
<Preparation of Aqueous Phase>
 n-Pentadecylbenzenesulfonic acid 5.5 parts by weight (15.0 mol-% based on total of monomers)
 Cetyl alcohol: 1.5 parts by weight
 Water: 200 parts by weight <Preparation of Particulate Resin Dispersion>
 The aforementioned aqueous solution thus prepared is stirred in a 70° C. constant temperature tank for 1 hour. The aforementioned aqueous phase 2 is put in a 1 l vessel in which the oil phase is then added. The mixture is then stirred at 8,000 rpm using Ultra Turrax (produced by IKA Corporation) for 3 minutes. The emulsion thus prepared is charged in a 500 ml reactor equipped with agitator where it is then subjected to polycondensation at 70° C. in a nitrogen atmosphere for 24 hours.

To the particulate resin dispersion thus prepared is added a solution of 1.1 parts by weight of ammonium persulfate in 10 parts by weight of deionized water. The mixture is then subjected to polymerization in a nitrogen atmosphere for 6 hours. As a result, a stable particulate resin dispersion is obtained. Similarly, a small portion of the particulate resin dispersion is sampled for the measurement of physical properties of polyester/styrene composite polymer.
Weight-average molecular weight of styrene by GPC: 39,000
Weight-average molecular weight of polyester by GPC: 4,200
Melting point of polyester: 57° C.
Median diameter: 290 nm The polymer thus obtained is then confirmed to be a particulate composite of styrene and polyester.
(Preparation of Particulate Releasing Agent (W1))
 Polyethylene wax: 30 parts by weight (Polywax 725; produced by TOYO-PETROLITE CO., LTD.: melting point: 103° C.)
 Cationic surfactant (SANISOL B50, produced by KAO CORPORATION): 3 parts by weight
 Deionized water: 67 parts by weight
 The aforementioned components are sufficiently dispersed using a Type Ultra Turrax T50 homogenizer (produced by IKA Corporation) while being heated to 95° C., and then subjected to dispersion using a pressure ejection type homogenizer (Gaulin homogenizer, produced by Gaulin Inc.) to prepare a particulate releasing agent dispersion (W1). The particulate releasing agent in the dispersion thus obtained had a number-average particle diameter $D_{50n}$ of 460 nm. The particulate releasing agent dispersion is then adjusted with deionized water to a solid content concentration of 30%.
(Preparation of Cyan Pigment Dispersion (C1))
 Cyan pigment: 20 parts by weight (Cit. Pigment Blue 15:3, produced by Dainichiseika Color & Chemicals Mfg. Co., Ltd.)
 Anionic surfactant (Neogen RK, produced by DAI-ICHI KOGYO SEIYAKU CO., LTD.): 2 parts by weight
 Deionized water: 78 parts by weight
 The aforementioned components are processed in the same manner as magenta pigment dispersion (Ml) to obtain a cyan pigment dispersion. The pigment in the dispersion thus obtained had a number-average particle diameter $D_{50n}$ of 121 nm. The cyan pigment dispersion is then adjusted with deionized water to a solid content concentration of 20%.
(Preparation of Particulate Resin Dispersion A: Amorphous Vinyl-Based Latex)
 Styrene: 460 parts by weight
 n-Butyl acrylate: 140 parts by weight
 Acrylic acid: 12 parts by weight
 Dodecane thiol: 9 parts by weight
 The aforementioned components are mixed and dissolved to prepare a solution.
 Separately, 12 parts by weight of an anionic surfactant (Dowfax, produced by Dow Chemical Co., Ltd.) are dissolved in 250 parts by weight of deionized water. To the solution is then added the aforementioned solution. The mixture is then dispersed in a flask so that it is emulsified. (Monomer emulsion A)

Further, 1 part by weight of the anionic surfactant (Dowfax, produced by Dow Chemical Co., Ltd.) is dissolved in 555 parts by weight of deionized water. The solution is then charged in a polymerization flask.

The polymerization flask is stopped, and then equipped with a reflux condenser. The polymerization flask is then heated to and kept at 75° C. over a water bath with slow stirring while nitrogen being injected thereinto.

9 parts by weight of ammonium persulfate are dissolved in 43 parts by weight of deionized water. The solution thus obtained is then added dropwise to the solution in the polymerization flask through a metering pump in 20 minutes. Thereafter, the monomer emulsion A is added dropwise to the mixture in the polymerization flask through the same metering pump in 200 minutes.

Thereafter, the polymerization flask is kept at 75° C. with slow stirring for 3 hours to complete polymerization.

In this manner, a particulate anionic resin dispersion A having a median particle diameter of 290 nm, a glass transition point of 52.0° C., a weight-average molecular weight of 30,000 and a solid content of 42% is obtained.

Toner Example A-1-1

Preparation of Toner from Example A-1-1 of Particulate Resin Dispersion (Preparation of Cyan Toner (Toner C1))
Particulate resin dispersion 1: 120 parts by weight
Particulate resin dispersion A: 40 parts by weight
Particulate releasing agent dispersion (W1): 33 parts by weight
Cyan pigment dispersion (C1): 60 parts by weight
10 wt-% Aqueous solution of polyaluminum chloride (PAC1000W, produced by Asada Kagaku K.K.): 15 parts by weight
0.1% Aqueous solution of nitric acid: 3 parts by weight The aforementioned components are dispersed at 5,000 rpm in a round stainless steel flask using a Type Ultra Turrax T50 homogenizer (produced by IKA Corporation) for 3 minutes. Thereafter, the flask is stopped by a cover equipped with an agitator having a magnetic seal, a thermometer and a pH meter. The flask is then equipped with a heating mantle heater. The flask is then heated at a rate of 1° C./min to 62° C. with stirring at a minimum rotary speed allowing the agitation of the entire dispersion in the flask. The flask is then kept at 62° C. for 30 minutes. The particle diameter of the agglomerated particles is then confirmed by a Type TAII coulter counter (produced by Coulter Co., Ltd.). After the termination of heating, 50 parts by weight of the particulate resin dispersion 1 are immediately added to the dispersion which is then kept for 30 minutes. To the dispersion is then added an aqueous solution of sodium hydroxide until the pH value of the system reached 6.5. The dispersion is then heated to 97° C. at a rate of 1° C./min. After heating, to the dispersion is added an aqueous solution of nitric acid to adjust the pH value of the system to 5.0. The dispersion is then kept at the same temperature for 10 hours to heat and fuse the agglomerated particles. Thereafter, the interior of the system is allowed to cool to 50° C. To the dispersion is then added an aqueous solution of sodium hydroxide to adjust the pH value thereof to 12.0. The dispersion is then kept for 10 minutes. Thereafter, the dispersion is withdrawn from the flask, sufficiently filtered with deionized water, washed with flowing water, and then dispersed in deionized water such that the solid content reached 10% by weight. To the dispersion is then added nitric acid to adjust the pH value thereof to 3.0. The dispersion is stirred for 10 minutes, sufficiently filtered with deionized water, and then filtered with flowing water to obtain a slurry which is then freeze-dried to obtain a cyan toner (toner C1).

To the cyan toner are then added a finely divided silica ($SiO_2$) having an average primary particle diameter of 40 nm the surface of which had been hydrophobicized with hexamethyl disilazalane (hereinafter occasionally abbreviated as "HMDS") and a finely divided methatitanic acid compound having an average primary particle diameter of 20 nm which is a reaction product of methatitanic acid and isobutyl trimethoxysilane each in an amount of 1% by weight. The mixture is then stirred using a Henschel mixer to prepare a silica-containing toner.

The toner thus prepared had a cumulative volume-average particle diameter $D_{50}$ of 5.7 μm, a volume-average particle size distribution index GSDv of 1.23 and a particle shape factor of 129.

For the measurement of cumulative volume-average particle diameter $D_{50}$ and volume-average particle size distribution index GSDV of the toner, a Type LA-700 laser diffraction type particle size distribution measuring instrument (produced by HORIBA, Ltd.) is used. For the measurement of shape factor of toner, the shape of the toner is observed by a luzex image analyzer.

Cyan toners are prepared from the resin dispersions of all the examples and comparative examples in the same manner and formulation as in Toner Example A-1-1.

[Method for Evaluating Toner]

<Evaluation of Heat Storage Properties (Heat Blocking Resistance) of Toner>

5 g of the toner is allowed to stand in a chamber having a temperature of 40° C. and a humidity of 50% RH for 17 hours. Thereafter, the toner is allowed to cool to room temperature. 2 g of the toner is put on a mesh having a mesh size of 45 μm which is then oscillated under predetermined conditions. The weight of the toner left on the mesh is then measured. The ratio of the weight of the toner left on the mesh to the initial weight of the toner is then calculated. This value is used as an index of heat blocking resistance of the toner.

Grade 3: heat blocking resistance index of 5% or less
Grade 2: heat blocking resistance index of 10% or less
Grade 1: heat blocking resistance index of more than 10%

<Evaluation of Cold Offset>

Using an image forming device (remodeled version of DocuCentredColor500, produced by Fuji Xerox Co., Ltd.), an image is formed on a transferring paper at various fixing temperatures. The temperature at which hot offset occurs is then evaluated.

Hot offset is evaluated according to the following criterion.
Grade 3: hot offset temperature of 200° C. or more
Grade 2: hot offset temperature of from not lower than 190° C. to lower than 200° C.
Grade 1: hot offset temperature of lower than 190° C.

<Evaluation of Image Quality Stability>

Using the aforementioned remodeled version of DocuCentredColor500, 100,000 sheets of images are outputted. The initial image and 100,000th image are then evaluated for image defects due to photoreceptor filming.

The image quality stability is evaluated according to the following criterion.
Grade 3: No image defects observed
Grade 2: Slight image defects occurred
Grade 1: Definite image defects occurred <Comprehensive Evaluation of Toner Properties>

The aforementioned evaluations are effected. The properties of the various toners are then judged by the evaluation grades as follows.

G: Various evaluation grades averaged 2.5 or more
F: Various evaluation grades averaged 2.0 or more
P: Various evaluation grades averaged less than 2.0

<Comprehensive Evaluation of Toner Stability>

The aforementioned evaluations are effected. The stability of the various toners to the amount of catalysts are then evaluated according to the following criterion.

G: One or less evaluation showing one grade change with the change of catalyst concentration F: Two or more evaluations showing one grade change with the change of catalyst concentration and one evaluation showing two or more grade changes with the change of catalyst concentration P: Three evaluations showing one grade change with the change of catalyst concentration and two or more evaluations showing two or more grade changes with the change of catalyst concentration The results of evaluation of Examples A-1 to A-4 and Comparative Examples A-1 to A-7 are set forth in Tables 1 and 2 below.

TABLE 1

|  | Example A-1 | | | Example A-2 | | | Example A-3 | | Example A-4 |
| --- | --- | --- | --- | --- | --- | --- | --- | --- | --- |
|  | A-1-1 | A-1-2 | A-1-3 | A-2-1 | A-2-2 | A-2-3 | A-3-1 | A-3-2 | A-4 |
| Straight-chain polycondensation catalyst (mol-%) | 1 | 0.1 | 0.35 | 1.5 | 0.15 | 0.53 | 1.0 | 0.18 | 3.3 |
| Branched polycondensation catalyst (mol-%) | 1 | 0.1 | 0.35 | 0.5 | 0.05 | 0.17 | 1.0 | 0.02 | 6.6 |
| Total catalyst concentration | 2 | 0.2 | 0.7 | 2 | 0.2 | 0.7 | 2.0 | 0.2 | 9.9 |
| Mw | 12,000 | 14,500 | 14,000 | 17,000 | 18,500 | 18,500 | 8,600 | 11,500 | 7,200 |
| Tg or Tm (° C.) | 55 | 55.5 | 55.5 | 67.0 | 68.5 | 68.0 | 62.0 | 63.0 | 58 |
| Median diameter of particulate resin (nm) | 380 | 420 | 410 | 320 | 360 | 340 | 390 | 450 | 350 |
| Toner diameter (μm) | 5.7 | 5.7 | 5.6 | 5.8 | 5.8 | 5.9 | 6.0 | 6.1 | 6.0 |
| GSDv | 1.23 | 1.22 | 1.22 | 1.24 | 1.23 | 1.23 | 1.25 | 1.23 | 1.24 |
| Shape factor | 129 | 130 | 130 | 128 | 129 | 128 | 130 | 128 | 129 |
| Degree of heat agglomeration | 3 | 3 | 3 | 3 | 3 | 3 | 3 | 3 | 2 |
| Offset | 3 | 3 | 3 | 3 | 3 | 3 | 3 | 3 | 3 |
| Image quality stability | 3 | 3 | 3 | 3 | 3 | 3 | 3 | 3 | 3 |
| Toner properties | G | G | G | G | G | G | G | G | G |
| Toner stability |  | G |  |  | G |  |  | G |  |

TABLE 2

|  | Comparative Example A-1 | | | Comparative Example A-2 | Comparative Example A-3 | |
| --- | --- | --- | --- | --- | --- | --- |
|  | A-1-1 | A-1-2 | A-1-3 | A-2 | A-3-1 | A-3-2 |
| Straight-chain poly-condensation catalyst (mol-%) | 2 | 0.2 | 0.7 | None | 2.0 | 0.7 |
| Branched poly-condensation catalyst (mol-%) | None | None | None | 0.2 | 0.02 | 0.013 |
| Total catalyst concentration | 2 | 0.2 | 0.7 | 0.2 | 2 | 0.7 |
| Mw | 9,200 | 15,000 | 11,500 | 8,800 | 11,500 | 16,500 |
| Tg or Tm (° C.) | 51 | 55.5 | 53.5 | 50 | 64 | 67 |
| Median diameter of particulate resin (nm) | 400 | 450 | 420 | 410 | 340 | 390 |
| Toner diameter (μm) | 6.1 | 5.9 | 5.9 | 6.2 | 6.0 | 5.8 |
| GSDv | 1.25 | 1.23 | 1.25 | 1.24 | 1.25 | 1.24 |
| Shape factor | 126 | 129 | 129 | 125 | 128 | 130 |
| Degree of heat agglomeration | 2 | 3 | 2 | 2 | 2 | 3 |
| Offset | 2 | 3 | 3 | 2 | 3 | 3 |
| Image quality stability | 2 | 3 | 3 | 2 | 2 | 3 |
| Toner properties | F | G | G | F | F | G |
| Toner stability |  | P |  |  | F |  |

TABLE 2-continued

| | Comparative example A-4 | | Comparative Example A-5 | | Comparative Example A-6 | Comparative Example A-7 |
|---|---|---|---|---|---|---|
| | A-4-1 | A-4-2 | A-5-1 | A-5-2 | A-6 | A-7 |
| Straight-chain poly-condensation catalyst (mol-%) | 0.02 | 0.013 | 2.0 | 0.2 | None | 15.0 |
| Branched poly-condensation catalyst (mol-%) | 2.0 | 0.7 | None | None | 9.9 | None |
| Total catalyst concentration | 2 | 0.7 | 2.0 | 0.2 | 9.9 | 15.0 |
| Mw | 7,500 | 8,000 | 6,500 | 8,500 | 3,100 | 4,200 |
| Tg or Tm (° C.) | 63 | 63.5 | 60.0 | 62.0 | 57 | 57 |
| Median diameter of particlulate resin (nm) | 470 | 490 | 370 | 400 | 350 | 290 |
| Toner diameter (μm) | 6.1 | 6.0 | 6.0 | 6.0 | 6.1 | 5.9 |
| GSDv | 1.24 | 1.24 | 1.25 | 1.23 | 1.26 | 1.27 |
| Shape factor | 127 | 126 | 128 | 130 | 128 | 126 |
| Degree of heat agglomeration | 1 | 2 | 3 | 3 | 1 | 1 |
| Offset | 2 | 2 | 2 | 3 | 2 | 2 |
| Image quality stability | 1 | 2 | 2 | 3 | 2 | 3 |
| Toner properties | P | F | F | G | P | F |
| Toner stability | | P | | F | | |

The first exemplary embodiment of the invention provides a binder resin which shows little change of reactivity attributed to the amount of catalysts and is stably includes a polycondensed resin, a particulate resin dispersion including same and a method for producing same.

Example B-1

<Preparation of Resin 1>
Bisphenol A-ethylene oxide 2 mol adduct: 31.5 parts by weight
Cyclohexanedicarboxylic acid: 17.0 parts by weight
Pentadecylbenzenesulfonic acid: 0.15 parts by weight
(hereinafter, straight-chain (=normal type))

The aforementioned materials are mixed, and then charged in a 200 ml reactor equipped with an agitator where the mixture is then subjected to polycondensation at 120° C. and atmospheric pressure for 24 hours to obtain a uniformly transparent amorphous polyester resin.

A small portion of the amorphous polyester resin thus obtained is sampled for the measurement of the following physical properties.
Weight-average molecular weight by GPC: 13,800
Number-average molecular weight by GPC: 6,150
Molecular weight distribution: 2.2
Glass transition temperature (onset): 52° C.

For the determination of the aforementioned molecular weights, weight-average molecular weight Mw and number-average molecular weight Mn are measured by gel permeation chromatography (GPC) under the following conditions. In some detail, a solvent (tetrahydrofurane) is allowed to flow at a rate of 1.2 ml per minute at a temperature of 40° C. Under these conditions, a 0.2 g/20 ml tetrahydrofurane sample solution is injected in an amount of 3 mg as calculated in terms of sample to effect measurement. The measurement of the molecular weight of a sample is made under the conditions such that the molecular weight of the sample is included in a range within which a linear relationship is established between the logarithm of molecular weight and the number counted on the calibration curve made on several monodisperse polystyrene standard samples.

The reliability of the measurements can be confirmed by judging to see if NBS706 polystyrene standard sample exhibits a weight-average molecular weight Mw of $28.8 \times 10^4$ and a number-average molecular weight Mn of $13.7 \times 10^4$ as measured under the aforementioned conditions.

As the column for GPC there is used any of TSK-GEL and GMH (produced by TOSOH CORPORATION) and other products satisfying the aforementioned requirements.

For the calculation of molecular weight distribution, the following equation is used.

$$\text{Molecular weight distribution } MwD = \text{weight-average molecular weight/number-average molecular weight}$$

For the measurement of the glass transition temperature Tg of polyester, a differential scanning calorimeter (DSC-50, produced by Shimadzu Corporation) is used.

Example B-2

<Preparation of Resin 2>
Bisphenol A-ethylene oxide 2 mol adduct: 31.5 parts by weight 1,4-Phenylenedicarboxylic acid: 19.5 parts by weight
n-Dodecanesulfonic acid: 0.1 parts The aforementioned materials are mixed, and then charged in a 200 ml reactor equipped with an agitator where the mixture is then subjected to polycondensation at 120° C. and atmospheric pressure for 24 hours to obtain a uniformly transparent amorphous polyester resin.

A small portion of the amorphous polyester resin thus obtained is sampled for the measurement of the following physical properties.
Weight-average molecular weight by GPC: 14,300
Number-average molecular weight by GPC: 6,200
Molecular weight distribution: 2.3
Glass transition temperature (onset): 53° C.

Example B-3

<Preparation of Resin 3>
Bisphenol A-ethylene oxide 2 mol adduct: 31.5 parts by weight 1,4-Phenylenedipropanoic acid: 22.0 parts by weight
3-Fluoro-4-dodecylbenzenesulfonic acid: 0.15 parts by weight (Hammett's value σm of $R^4$=0.352)

The aforementioned materials are mixed, and then charged in a 200 ml reactor equipped with an agitator where the mixture is then subjected to polycondensation at 120° C. and atmospheric pressure for 24 hours to obtain a uniformly transparent amorphous polyester resin.

A small portion of the amorphous polyester resin thus obtained is sampled for the measurement of the following physical properties.
Weight-average molecular weight by GPC: 19,300
Number-average molecular weight by GPC: 8,040
Molecular weight distribution: 2.4
Glass transition temperature (onset): 51° C.

Example B-4

<Preparation of Resin 4>
Bisphenol A-ethylene oxide 2 mol adduct: 31.5 parts by weight Cyclohexanedicarboxylic acid: 17.0 parts by weight
Pentadecylbenzenesulfonic acid: 0.15 parts by weight (hard type, Tayca Power B150, produced by Tayca Corporation)

The aforementioned materials are mixed, and then charged in a 200 ml reactor equipped with an agitator where the mixture is then subjected to polycondensation at 120° C. and atmospheric pressure for 24 hours to obtain a uniformly transparent amorphous polyester resin.

A small portion of the amorphous polyester resin thus obtained is sampled for the measurement of the following physical properties.
Weight-average molecular weight by GPC: 10,900
Number-average molecular weight by GPC: 4,550
Molecular weight distribution: 2.4
Glass transition temperature (onset): 50° C.

Example B-5

<Preparation of Resin 5>
1,9-Nonanediol: 16.0 parts by weight
1,12-Dodecane dioic acid: 23.0 parts by weight
n-Octadecylbenzenesulfonic acid: 0.20 parts by weight The aforementioned materials are mixed, and then charged in a 200 ml reactor equipped with an agitator where the mixture is then subjected to polycondensation at 120° C. and atmospheric pressure for 24 hours to obtain a uniformly transparent crystalline polyester resin.

A small portion of the crystalline polyester resin thus obtained is sampled for the measurement of the following physical properties.
Weight-average molecular weight by GPC: 17,100
Number-average molecular weight by GPC: 6,840
Molecular weight distribution: 2.5
Melting point: 72° C.

Example B-6

<Preparation of Resin 6>
1,4-Butanediol: 9.2 parts by weight
1,9-Azelaic acid: 19.0 parts by weight
n-Octadecylbenzenesulfonic acid: 0.20 parts by weight The aforementioned materials are mixed, and then charged in a 200 ml reactor equipped with an agitator where the mixture is then subjected to polycondensation at 120° C. and atmospheric pressure for 24 hours to obtain a uniformly transparent crystalline polyester resin.

A small portion of the crystalline polyester resin thus obtained is sampled for the measurement of the following physical properties.
Weight-average molecular weight by GPC: 9,600
Number-average molecular weight by GPC: 3,350
Molecular weight distribution: 2.9
Melting point: 54° C.

Comparative Example B-1

<Preparation of Resin 7>
Bisphenol A-ethylene oxide 2 mol adduct: 31.5 parts by weight
Cyclohexanedicarboxylic acid: 17.0 parts by weight
n-octylbenzenesulfonic acid: 0.10 parts by weight The aforementioned materials are mixed, and then charged in a 200 ml reactor equipped with an agitator where the mixture is then subjected to polycondensation at 120° C. and atmospheric pressure for 24 hours to obtain a uniformly transparent amorphous polyester resin.

A small portion of the amorphous polyester resin thus obtained is sampled for the measurement of the following physical properties.
Weight-average molecular weight by GPC: 8,100
Number-average molecular weight by GPC: 2,450
Molecular weight distribution: 3.3
Glass transition temperature: 49° C.

Comparative Example B-2

<Preparation of Resin 8>
Bisphenol A-ethylene oxide 2 mol adduct: 31.5 parts by weight
1,4-Phenylenedicarboxylic acid: 19.5 parts by weight
Sulfuric acid: 0.05 parts by weight The aforementioned materials are mixed, and then charged in a 200 ml reactor equipped with an agitator where the mixture is then subjected to polycondensation at 120° C. and atmospheric pressure for 24 hours to obtain a uniformly transparent amorphous polyester resin.

A small portion of the amorphous polyester resin thus obtained is sampled for the measurement of the following physical properties.
Weight-average molecular weight by GPC: 7,850
Number-average molecular weight by GPC: 2,050
Molecular weight distribution: 3.8
Glass transition temperature: 49° C.

Comparative Example B-3

<Preparation of Resin 9>
Bisphenol A-ethylene oxide 2 mol adduct: 31.5 parts by weight
1,4-Phenylenedicarboxylic acid: 19.5 parts by weight
Dibutyltin oxide: 0.10 parts by weight The aforementioned materials are mixed, and then charged in a 200 ml reactor equipped with an agitator where the mixture is then subjected to polycondensation at 120° C. and atmospheric pressure for 24 hours to obtain a turbid polyester.

A small portion of the turbid polyester resin thus obtained is sampled for the measurement of the following physical properties.
Weight-average molecular weight by GPC: 2,900
Number-average molecular weight by GPC: 1,100

Molecular weight distribution: 2.63
Glass transition temperature: 30° C.

Comparative Example B-4

<Preparation of Resin 10>
1,4-Butanediol: 9.2 parts by weight
1,6-Adipic acid: 14.6 parts by weight
n-Octadecylbenzenesulfonic acid: 0.20 parts by weight The aforementioned materials are mixed, and then charged in a 200 ml reactor equipped with an agitator where the mixture is then subjected to polycondensation at 120° C. and atmospheric pressure for 24 hours to obtain a uniformly transparent crystalline polyester resin.

A small portion of the crystalline polyester resin thus obtained is sampled for the measurement of the following physical properties.
Weight-average molecular weight by GPC: 7,100
Number-average molecular weight by GPC: 1,850
Molecular weight distribution: 3.8
Melting point: 50° C.

Comparative Example B-5

<Preparation of Resin 11>
Bisphenol A-ethylene oxide 2 mol adduct: 31.5 parts by weight
Cyclohexanedicarboxylic acid: 17.0 parts by weight
p-Nitrobenzenesulfonic acid: 0.1 parts
(Hammett's value $\sigma_p^0$ of nitro group by weight=0.81)

The aforementioned materials are mixed, and then charged in a 200 ml reactor equipped with an agitator where the mixture is then subjected to polycondensation at 120° C. and atmospheric pressure for 24 hours to obtain a uniformly amorphous polyester resin.

A small portion of the amorphous polyester resin thus obtained is sampled for the measurement of the following physical properties.
Weight-average molecular weight by GPC: 6,200
Number-average molecular weight by GPC: 2,100
Molecular weight distribution: 2.9
Glass transition temperature: 47° C.

Comparative Example B-6

<Preparation of Resin 12>
1,9-Nonanediol: 16.0 parts by weight
1,12-Dodecane dioic acid: 23.0 parts by weight
Ethanesulfonic acid: 0.05 parts by weight The aforementioned materials are mixed, and then charged in a 200 ml reactor equipped with an agitator where the mixture is then subjected to polycondensation at 120° C. and atmospheric pressure for 24 hours to obtain a uniformly transparent crystalline polyester resin.

A small portion of the crystalline polyester resin thus obtained is sampled for the measurement of the following physical properties.
Weight-average molecular weight by GPC: 6,550
Number-average molecular weight by GPC: 1,950
Molecular weight distribution: 3.4
Melting point: 64° C.

TABLE 3

| | Resin | Polycarboxylic acid | Polyol | Polycondensation catalyst | Weight-average molecular weight | Number-average molecular weight | Molecular weight distribution | Glass transition point or (melting point) (° C.) |
|---|---|---|---|---|---|---|---|---|
| Example B-1 | 1 | CHDA | BisA1EO | PDBSA (straight-chain) | 13,800 | 6,150 | 2.2 | 52 |
| Example B-2 | 2 | PDAA | BisA1EO | DSA | 14,300 | 6,200 | 2.3 | 53 |
| Example B-3 | 3 | PDPA | BisA1EO | Fluorinated DBSA | 19,300 | 8,040 | 2.4 | 51 |
| Example B-4 | 4 | CHPA | BisA1EO | PDBSA (hard type) | 10,900 | 4,500 | 2.4 | 50 |
| Example B-5 | 5 | DDA | 1,9-ND | ODBSA | 17,100 | 6,840 | 2.5 | (72) |
| Example B-6 | 6 | Azelaic acid | 1,4-BD | ODBSA | 9,600 | 3,350 | 2.9 | (54) |
| Comparative Example B-1 | 7 | CHDA | BisA1EO | OBSA | 8,100 | 2,450 | 3.3 | 49 |
| Comparative Example B-2 | 8 | PDAA | BisA1EO | Sulfuric acid | 7,850 | 2,050 | 3.8 | 49 |
| Comparative Example B-3 | 9 | PDAA | BisA1EO | Dibutyltin oxide | 2,900 | 1,100 | 2.6 | 30 |
| Comparative Example B-4 | 10 | Adipic acid | 1,4-BD | ODBSA | 7,100 | 1,850 | 3.8 | (50) |
| Comparative Example B-5 | 11 | CHDA | BisA1EO | p-NBSA | 6,200 | 2,100 | 2.9 | 47 |
| Comparative Example B-6 | 12 | DDA | 1,9-ND | Ethanesulfonic acid | 6,550 | 1,950 | 3.4 | (64) |

The abbreviations in Table 3 above indicate the following respective compound.
CHDA: Cyclohexanedicarboxylic acid
PDAA: 1,4-Phenylenediacarboxylic acid
PDPA: 1,4-Phenylenedipropanoic acid
1,12-DDA: 1,12-Dodecane dioic acid (1,10-decane dicarboxylic acid)
BisA1EO: Bisphenol A-ethylene oxide 1 mol adduct
1,9-ND: 1,9-Nonanediol
1,4-BD: 1,4-Butanediol
PDBSA (straight-chain type): n-Pentadecylbenzene sulfonic acid
PDBSA (hard type): pentadecylbenzenesulfonic acid (hard type,
Tayca Power B150, produced by Tayca Corporation)
DSA: n-Dodecanesulfonic acid
Fluorinated DBSA: 3-Fluoro-4-dodecylbenzenesulfonic acid
ODBSA: n-Octadecylbenzenesulfonic acid
OBSA: n-Octylbenzenesulfonic acid
p-NBSA: p-Nitrobenzenesulfonic acid <Preparation of Aqueous Dispersion of Particulate Resin>
The resin 1 thus obtained is charged in a three-necked flask equipped with agitator and cooling pipe where it is then stirred with a 1 N aqueous solution of NaOH gradually added thereto while being kept at 95° C. When the added amount of aqueous solution of NaOH reached 50 parts by weight in total, the resin became slurried. The slurry thus obtained is charged in a flask having 180 parts by weight of a deionized water which had been adjusted to 85° C. The mixture is emulsified for 10 minutes using a homogenizer (Ultra Turrax, produced by IKA Corporation), and then emulsified for 10 minutes in an ultrasonic bath. The flask is then cooled with room temperature water.

As a result, a particulate polyester resin dispersion (1) having a rein particle median diameter of 420 nm is obtained.

The aforementioned resins 2 to 12 are processed in the same manner as the particulate resin dispersion (1) to prepare particulate resin dispersions (2) to (12), respectively, which are each then measured for resin particle median diameter using a Type LA-920 laser diffraction type particle size distribution measuring instrument (produced by HORIBA, Ltd.).

The particulate resin dispersions thus prepared are then used to prepare toners.
(Preparation of Particulate Releasing Agent Dispersion (W1))
Polyethylene wax (Polywax 725; produced by TOYO-PETROLITE CO., LTD.: melting point: 103° C.): 30 parts by weight
Cationic surfactant (SANISOL B50, produced by KAO CORPORATION): 3 parts by weight
Deionized water: 67 parts by weight The aforementioned components are sufficiently dispersed using a Type Ultra Turrax T50 homogenizer (produced by IKA Corporation) while being heated to 95° C., and then subjected to dispersion using a pressure ejection type homogenizer (Gaulin homogenizer, produced by Gaulin Inc.) to prepare a particulate releasing agent dispersion (W1). The particulate releasing agent in the dispersion thus obtained had a number-average particle diameter $D_{50n}$ of 460 nm. The particulate releasing agent dispersion is then adjusted with deionized water to a solid content concentration of 30%.
(Preparation of Cyan Pigment Dispersion (C1))
Cyan pigment (C.I. Pigment Blue 15:3, produced by Dainichiseika Color & Chemicals Mfg. Co., Ltd.): 20 parts by weight
Anionic surfactant (Neogen RK, produced by DAI-ICHI KOGYO SEIYAKU CO., LTD.): 2 parts by weight
Deionized water: 78 parts by weight The aforementioned components are mixed and dissolved according the foregoing formulation, and then subjected to dispersion using a Type Ultra Turrax homogenizer (produced by IKA Corporation) for 5 minutes and dispersion using an ultrasonic bath for 10 minutes to obtain a cyan pigment dispersion (C1). The pigment in the dispersion thus obtained had a number-average particle diameter $D_{50}$, of 121 nm. The cyan pigment dispersion is then adjusted with deionized water to a solid content concentration of 15%.
(Preparation of Particulate Resin Dispersion A: Amorphous Vinyl-Based Latex)
Styrene: 460 parts by weight
n-Butyl acrylate: 140 parts by weight
Acrylic acid: 12 parts by weight
Dodecane thiol: 9 parts by weight The aforementioned components are mixed and dissolved to prepare a solution.

Separately, 12 parts by weight of an anionic surfactant (Dowfax, produced by Dow Chemical Co., Ltd.) are dissolved in 250 parts by weight of deionized water. To the solution is then added the aforementioned solution. The mixture is then dispersed in a flask so that it is emulsified. (Monomer emulsion A)

Further, 1 part by weight of the anionic surfactant (Dowfax, produced by Dow Chemical Co., Ltd.) is dissolved in 555 parts by weight of deionized water. The solution is then charged in a polymerization flask.

The polymerization flask is stopped, and then equipped with a reflux condenser. The polymerization flask is then heated to and kept at 75° C. over a water bath with slow stirring while nitrogen being injected thereinto.

9 parts by weight of ammonium persulfate are dissolved in 43 parts by weight of deionized water. The solution thus obtained is then added dropwise to the solution in the polymerization flask through a metering pump in 20 minutes. Thereafter, the monomer emulsion A is added dropwise to the mixture in the polymerization flask through the same metering pump in 200 minutes.

Thereafter, the polymerization flask is kept at 75° C. with slow stirring for 3 hours to complete polymerization.

In this manner, a particulate anionic resin dispersion A having a median particle diameter of 340 nm, a glass transition point of 53.0° C., a weight-average molecular weight of 32,000 and a solid content of 42% is obtained.

Toner Example B-1

Preparation of Toner from Particulate Resin Dispersion (1)

(Preparation of Cyan Toner (Toner C1))
Particulate resin dispersion (1): 120 parts by weight
Particulate resin dispersion A: 40 parts by weight
Particulate releasing agent dispersion (W1): 33 parts by weight
Cyan pigment dispersion (C1): 60 parts by weight
10 wt-% Aqueous solution of polyaluminum chloride (PAC100W, produced by Asada Kagaku K.K.): 15 parts by weight 1% Aqueous solution of nitric acid: 3 parts by weight The aforementioned components are dispersed at 5,000 rpm in a round stainless steel flask using a Type Ultra Turrax T50 homogenizer (produced by IKA Corporation) for 3-minutes. Thereafter, the flask is stopped by a cover equipped with an agitator having a magnetic seal, a thermometer and a pH meter. The flask is then equipped with a heating mantle heater. The flask is then heated at a rate of 1° C./min to 62° C. with stirring at a minimum rotary speed allowing the agitation of the entire dispersion in the flask. The flask is then kept at 62° C. for 30 minutes. The particle diameter of the agglomerated particles is then confirmed by a Type TAII coulter counter (produced by Coulter Co., Ltd.). After the termination of heating, 50 parts by weight of the particulate resin dispersion (L1) are immediately added to the dispersion which is then kept for 30 minutes. To the dispersion is then added an aqueous solution of sodium hydroxide until the pH value of the system reached 6.5. The dispersion is then heated to 97° C. at a rate of 1° C./min. After heating, to the dispersion is added an aqueous solution of nitric acid to adjust the pH value of the system to 5.0. The dispersion is then kept at the same temperature for 10 hours to heat and fuse the agglomerated particles. Thereafter, the interior of the system is allowed to cool to 50° C. To the dispersion is then added an aqueous solution of sodium hydroxide to adjust the pH value thereof to 12.0. The dispersion is then kept for 10 minutes. Thereafter, the dispersion is withdrawn from the flask, sufficiently filtered with deionized water, washed with flowing water, and then dispersed in deionized water such that the solid content reached 10% by weight. To the dispersion is then added nitric acid to adjust the pH value thereof to 3.0. The dispersion is stirred for 10 minutes, sufficiently filtered with deionized water, and then filtered with flowing water to obtain a slurry which is then freeze-dried to obtain a cyan toner (toner C1).

To the particulate cyan-colored material are then added a finely divided silica ($SiO_2$) having an average primary particle diameter of 40 nm the surface of which had been hydrophobicized with hexamethyl disilazalane (hereinafter occasionally abbreviated as "HMDS") and a finely divided methatitanic acid compound having an average primary particle diameter of 20 nm which is a reaction product of methatitanic acid and isobutyl trimethoxysilane each in an amount of 1% by weight. The mixture is then stirred using a Henschel mixer to prepare a silica-containing toner.

The toner thus prepared had a cumulative volume-average particle diameter $D_{50}$ of 5.9 μm, a volume-average particle size distribution index GSDv of 2.2 and a particle shape factor of 130.

For the measurement of cumulative volume-average particle diameter $D_{50}$ and volume-average particle size distribution index GSDv of the toner, a Type LA-700 laser diffraction type particle size distribution measuring instrument (produced by HORIBA, Ltd.) is used. For the measurement of shape factor of toner, the shape of the toner is observed by a luzex image analyzer.

Toner Example B-2

Preparation of Toner from Particulate Resin Dispersion (2)

A particulate cyan-colored material is obtained in the same manner as Toner Example B-1 except that the particulate resin dispersion is changed to the particulate resin dispersion (2). The toner thus prepared is then measured. As a result, the toner showed a cumulative volume-average particle diameter $D_{50}$ of 5.9 μm, a volume-average particle size distribution index GSDV of 1.23 and a particle shape factor of 132. To the toner is then added additives in the same manner as Toner Example B-1 to obtain a cyan-containing toner.

Toner Example B-3

Preparation of Toner from Particulate Resin Dispersion (3)

A particulate cyan-colored material is obtained in the same manner as Toner Example B-1 except that the particulate resin dispersion is changed to the particulate resin dispersion (3). The toner thus prepared is then measured. As a result, the toner showed a cumulative volume-average particle diameter $D_{50}$ of 6.1 μm, a volume-average particle size distribution index GSDv of 1.24 and a particle shape factor of 128. To the toner is then added additives in the same manner as Toner Example B-1 to obtain a cyan-containing toner.

Toner Example B-4

Preparation of Toner from Particulate Resin Dispersion (4)

A particulate cyan-colored material is obtained in the same manner as Toner Example B-1 except that the particulate resin dispersion is changed to the particulate resin dispersion (4). The toner thus prepared is then measured. As a result, the toner showed a cumulative volume-average particle diameter $D_{50}$ of 6.1 μm, a volume-average particle size distribution index GSDv of 1.22 and a particle shape factor of 129. To the toner is then added additives in the same manner as Toner Example B-1 to obtain a cyan-containing toner.

Toner Example B-5

Preparation of Toner from Particulate Resin Dispersion (5)

A particulate cyan-colored material is obtained in the same manner as Toner Example B-1 except that the particulate resin dispersion is changed to the particulate resin dispersion (5). The toner thus prepared is then measured. As a result, the toner showed a cumulative volume-average particle diameter $D_{50}$ of 6.0 μm, a volume-average particle size distribution index GSDv of 1.25 and a particle shape factor of 125. To the toner is then added additives in the same manner as Toner Example B-1 to obtain a cyan-containing toner.

Toner Example B-6

Preparation of Toner from Particulate Resin Dispersion (6))

A particulate cyan-colored material is obtained in the same manner as Toner Example B-1 except that the particulate resin dispersion is changed to the particulate resin dispersion (6). The toner thus prepared is then measured. As a result, the toner showed a cumulative volume-average particle diameter $D_{50}$ of 6.0 μm, a volume-average particle size distribution index GSDv of 1.28 and a particle shape factor of 124. To the toner is then added additives in the same manner as Toner Example B-1 to obtain a cyan-containing toner.

Toner Comparative Example B-1

Preparation of Toner from Particulate Resin Dispersion (7)

A particulate cyan-colored material is obtained in the same manner as Toner Example B-1 except that the particulate resin dispersion is changed to the particulate resin dispersion (7). The toner thus prepared is then measured. As a result, the toner showed a cumulative volume-average particle diameter $D_{50}$ of 6.1 μm, a volume-average particle size distribution index GSDv of 1.30 and a particle shape factor of 128. To the toner is then added additives in the same manner as Toner Example B-1 to obtain a cyan-containing toner.

Toner Comparative Example B-2

Preparation of Toner from Particulate Resin Dispersion (8)

A particulate cyan-colored material is obtained in the same manner as Toner Example B-1 except that the particulate resin dispersion is changed to the particulate resin dispersion (8). The toner thus prepared is then measured. As a result, the toner showed a cumulative volume-average particle diameter $D_{50}$ of 5.9 μm, a volume-average particle size distribution index GSDV of 1.31 and a particle shape factor of 129. To the toner is then added additives in the same manner as Toner Example B-1 to obtain a cyan-containing toner.

Toner Comparative Example B-3

Preparation of Toner from Particulate Resin Dispersion (9)

A particulate cyan-colored material is obtained in the same manner as Toner Example B-1 except that the particulate resin dispersion is changed to the particulate resin dispersion (9). The toner thus prepared is then measured. As a result, the toner showed a cumulative volume-average particle diameter $D_{50}$ of 5.8 µm, a volume-average particle size distribution index GSDv of 1.35 and a particle shape factor of 123. To the toner is then added additives in the same manner as Toner Example B-1 to obtain a cyan-containing toner.

Toner Comparative Example B-4

Preparation of Toner from Particulate Resin Dispersion (10))

A particulate cyan-colored material is obtained in the same manner as Toner Example B-1 except that the particulate resin dispersion is changed to the particulate resin dispersion (10). The toner thus prepared is then measured. As a result, the toner showed a cumulative volume-average particle diameter $D_{50}$ of 6.1 µm, a volume-average particle size distribution index GSDv of 1.30 and a particle shape factor of 123. To the toner is then added additives in the same manner as Toner Example B-1 to obtain a cyan-containing toner.

Toner Comparative Example B-5

Preparation of Toner from Particulate Resin Dispersion (11)

A particulate cyan-colored material is obtained in the same manner as Toner Example B-1 except that the particulate resin dispersion is changed to the particulate resin dispersion (11). The toner thus prepared is then measured. As a result, the toner showed a cumulative volume-average particle diameter $D_{50}$ of 5.8 µm, a volume-average particle size distribution index GSDv of 1.33 and a particle shape factor of 126. To the toner is then added additives in the same manner as Toner Example B-1 to obtain a cyan-containing toner.

Toner Comparative Example B-6

Preparation of Toner from Particulate Resin Dispersion (12)

A particulate cyan-colored material is obtained in the same manner as Toner Example B-1 except that the particulate resin dispersion is changed to the particulate resin dispersion (12). The toner thus prepared is then measured. As a result, the toner showed a cumulative volume-average particle diameter $D_{50}$ of 6.0 µm, a volume-average particle size distribution index GSDV of 1.30 and a particle shape factor of 127. To the toner is then added additives in the same manner as Toner Example B-1 to obtain a cyan-containing toner.

<Preparation of Carrier>

To 100 parts by weight of a particulate Cu—Zn ferrite having a volume-average particle diameter of 40 µm is added a methanol solution containing 0.1 parts by weight of γ-aminopropyltriethoxysilane. The mixture is then processed by a kneader so that the ferrite is covered with the silane compound. Methanol is then distilled off. The material is then heated to 120° C. for 2 hours to completely harden the silane compound. To the particulate material is then added a solution of a perfluorooctyl ethyl methacrylate-methyl methacrylate copolymer (copolymerization ratio: 40:60) in toluene. The coated material is then processed by a vacuum kneader such that the coverage of the perfluorooctyl ethyl methacrylate-methyl methacrylate copolymer reached 0.5% by weight to produce a resin-coated carrier.

<Preparation of Developer>

4 parts by weight of each of the various toners thus prepared are mixed with 100 parts by weight of the aforementioned resin-coated carrier to prepare an electrostatic image developer. These electrostatic image developers are each then used as developer in the following evaluation processes.

<Preparation of Ground Toner and Developer>

The resins 1, 7 band 9 thus prepared are each then used to prepare a ground toner.

Toner Example B-7

Resin 1: 85 parts by weight
Aliphatic hydrocarbon-aromatic hydrocarbon copolymer petroleum resin (1.5/1.5/97 copolymer (by monomer weight ratio) of C5-based petroleum fraction (isoprene)/C5-based petroleum fraction (piperylene)/isopropenyl toluene): 10 parts by weight
Carbon black (BPL, produced by Cabot Corporation): 6 parts by weight
Polypropylene wax (P200, produced by Mitsubishi Chemical: 4 parts by weight Corporation)
Polyethylene wax (PE130, produced by Clariant Japan Corporation): 1 part by weight The mixture of the aforementioned components is melt-kneaded using a Banbury mixer for 5 minutes, rolled/cooled, roughly ground using a hammer mill, finely ground using a jet mill, and then classified using an air classifier to obtain a particulate toner material having a volume-average particle diameter of 9.0 µm. 100 parts by weight of the particulate toner material are then mixed with 1.0 part by weight of titanium oxide and 0.3 parts by weight of hydrophobic silica using a Henschel mixer to obtain a black toner. 6 parts by weight of the toner are then mixed with 100 parts by weight of a carrier having a particle diameter of 50 µm comprising a ferrite core coated with 2% of a styrene-acryl resin to obtain a developer.

Toner Comparative Example B-7

A developer of Comparative Example B-4 is obtained in the same manner as Toner Example B-7 except that the resin 1 is replaced by the resin 7. The toner thus prepared had a volume-average particle diameter of 9.2 µm.

Toner Comparative Example B-8

A developer of Comparative Example B-5 is obtained in the same manner as Toner Example B-7 except that the resin 1 is replaced by the resin 9. The toner thus prepared had a volume-average particle diameter of 9.5 µm. The ground toner obtained by jet mill grinding showed mild fusion of toner particles.

The cyan and black developers thus prepared are each subjected to the following evaluations.

<Particle Size Distribution>

Toners produced by the aqueous dispersion/agglomeration/coalescence method are evaluated for the particle size distribution with the following criteria.

G . . . GSDv of from not smaller than 1.0 to less than 1.25
F . . . GSDv of from not smaller than 1.25 to less than 1.30
P . . . GSDv of not smaller than 1.30

<Hot Offset Temperature>

Using an image forming device (remodeled version of DecumCentreColor500, produced by Fuji Xerox Co., Ltd.), an image is formed on a transferring paper with all the developers of examples and comparative examples thus prepared at various fixing temperatures. Hot offset generating temperature and cold offset generating temperature are then evaluated. Hot offset generating temperature is determined by confirming the lowest fixing temperature at which the toner can be attached to the fixing roll.

<Generation of Cold Offset>

With the set temperature fixed to 180° C., three sheets of black solid image are fixed. A white paper is then passed over the fixing roll. The degree of stain on the white paper is then observed to evaluate cold offset.

TABLE 4

| Toner Example | Resin used | Toner preparation method | GSDv | Hot offset temperature (° C.) | Cold offset (180° C. white paper stain) |
|---|---|---|---|---|---|
| Example B-1 | 1 | Aqueous dispersion/ agglomeration/ coalescence | G | 215 | None |
| Example B-2 | 2 | Aqueous dispersion/ agglomeration/ coalescence | G | 210 | None |
| Example B-3 | 3 | Aqueous dispersion/ agglomeration/ coalescence | G | 220 | None |
| Example B-4 | 4 | Aqueous dispersion/ agglomeration/ coalescence | G | 205 | None |
| Example B-5 | 5 | Aqueous dispersion/ agglomeration/ coalescence | F | 205 | None |
| Example B-6 | 6 | Aqueous dispersion/ agglomeration/ coalescence | F | 200 | None |
| Example B-7 | 1 | Grinding | | 200 | None |
| Comparative Example B-1 | 7 | Aqueous dispersion/ agglomeration/ coalescence | P | 195 | Slightly observed |
| Comparative Example B-2 | 8 | Aqueous dispersion/ agglomeration/ coalescence | P | 190 | Slightly observed |
| Comparative Example B-3 | 9 | Aqueous dispersion/ agglomeration/ coalescence | P | 170 | None |
| Comparative Example B-4 | 10 | Aqueous dispersion/ agglomeration/ coalescence | P | 190 | Slightly observed |
| Comparative Example B-5 | 11 | Aqueous dispersion/ agglomeration/ coalescence | P | 185 | Slightly observed |
| Comparative Example B-6 | 12 | Aqueous dispersion/ agglomeration/ coalescence | P | 190 | Slightly observed |
| Comparative Example B-7 | 7 | Grinding | | 180 | Observed |
| Comparative Example B-8 | 9 | Grinding | | 160 | Observed |

The second exemplary embodiment of the invention provides a binder resin having a high molecular weight and a sharp molecular weight distribution.

What is claimed is:

1. A method for producing a binder resin, comprising polycondensing a polycondensable monomer at a temperature of from 70° C. to 140° C. by using a polycondensation catalyst,
wherein the binder resin has a weight-average molecular weight ($M_w$) of from 7,200 to 18,500 and a glass transition temperature of from 55° C. to 68.5° C., and by using a polycondensation catalyst, wherein
the polycondensation catalyst comprises: at least one compound represented by formula (I) or (II); and at least one compound represented by formula (III) or (IV),
a weight ratio of total amount of the compounds represented by formula (I) or (II) used to total amount of the compounds represented by formula (III) or (IV) used is from 5:95 to 95:5, and
a total concentration of the polycondensation catalyst is from 9.9 to 0.2 mol % based on a total monomer content:

(I)

wherein $R^1$ represents a $C_{10}$-$C_{20}$ straight-chain alkyl group; $R^2$ represents a monovalent organic group; and number n of substituents $R^2$ represents an integer of from 0 to 4;

$R^3$—$SO_3H$ (II)

wherein $R^3$ represents a $C_{10}$-$C_{20}$ straight-chain alkyl group;

(III)

wherein $R^4$ represents a $C_{10}$-$C_{20}$ branched alkyl group; $R^5$ represents a monovalent organic group; and number m of substituents $R^5$ represents an integer of from 0 to 4; and

$R^6$—$SO_3H$ (IV)

wherein $R^6$ represents a $C_{10}$-$C_{20}$ branched alkyl group.

2. A method for producing a particulate resin dispersion comprising a particulate resin that contains a binder resin, the particulate resin being dispersed in a dispersion medium, and the binder resin contains a binder resin produced by the method of claim 1, the method for producing a particulate resin dispersion comprising:
preparing an emulsion dispersion having an oil phase containing a polycondensable monomer emulsion-dispersed in an aqueous medium; and
subjecting the polycondensable monomer to polycondensation in an aqueous medium by using the polycondensation catalyst,
wherein the polycondensation catalyst comprises: at least one compound represented by formula (I) or (II); and at least one compound represented by formula (III) or (IV), and
a weight ratio of total amount of the compounds represented by formula (I) or (II) used to total amount of the compounds represented by formula (III) or (IV) used is from 5:95 to 95:5:

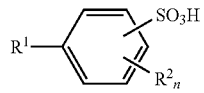 (I')

wherein $R^1$ represents a $C_{10}$-$C_{20}$ straight-chain alkyl group; $R^2$ represents a monovalent organic group; and number n of substituents $R^2$ represents an integer of from 0 to 4;

$R^3$—$SO_3H$  (II)

wherein $R^3$ represents a $C_{10}$-$C_{20}$ straight-chain alkyl group;

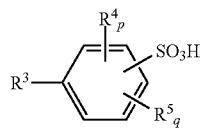 (II')

wherein $R^4$ represents a $C_{10}$-$C_{20}$ branched alkyl group; $R^5$ represents a monovalent organic group; and number m of substituents $R^5$ represents an integer of from 0 to 4; and $R^6$—$SO_3H$  (IV)

wherein $R^6$ represents a $C_{10}$-$C_{20}$ branched alkyl group.

3. A method for producing a binder resin, comprising polycondensing a polyvalent alcohol with a polyvalent carboxylic acid that has a residue group to which carboxyl groups are connected, the residue group having 5 or more carbon atoms, by using a polycondensation catalyst,
wherein the polycondensation catalyst comprises a compound represented by formula (II'):

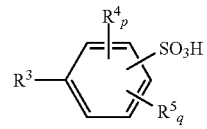 (II')

wherein $R^3$ represents a $C_8$-$C_{20}$ alkyl group; $R^4$ represents a group having a Hammett's value of 0.2 or more with sulfo group as reference; $R^5$ represents a group having a Hammett's value of less than 0.2 with sulfo group as reference; p represents an integer of from 1 to 4; and q represents an integer of from 0 to 3.

4. The method for producing a binder resin according to claim 1, wherein the polycondensation catalyst comprises:
at least one compound represented by formula (I) or (II); and
a compound represented by formula (III).

5. The method for producing a binder resin according to claim 1, wherein the polycondensation catalyst comprises:
the compound represented by formula (I); and
at least one compound represented by formula (III) or (IV).

6. The method for producing a binder resin according to claim 3, wherein the number of carbon atoms in the polyvalent alcohol is 5 or more.

* * * * *